(12) United States Patent
Nickerson et al.

(10) Patent No.: US 11,357,181 B2
(45) Date of Patent: Jun. 14, 2022

(54) DATA MODULATED SIGNAL GENERATION IN A MULTI-WIRE IRRIGATION CONTROL SYSTEM

(71) Applicant: Rain Bird Corporation, Azusa, CA (US)

(72) Inventors: Harvey J. Nickerson, El Cajon, CA (US); Bradley H. Dolbin, Tucson, AZ (US); Jonathan I. Marsters, San Diego, CA (US); Anderson Micu, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/175,372

(22) Filed: Feb. 12, 2021

(65) Prior Publication Data

US 2021/0243972 A1 Aug. 12, 2021

Related U.S. Application Data

(60) Provisional application No. 62/975,390, filed on Feb. 12, 2020.

(51) Int. Cl.
*A01G 25/16* (2006.01)
*G05B 19/042* (2006.01)

(52) U.S. Cl.
CPC ......... *A01G 25/165* (2013.01); *G05B 19/042* (2013.01); *G05B 2219/2625* (2013.01)

(58) Field of Classification Search
CPC ................ A01G 25/165; G05B 19/042; G05B 2219/2625
See application file for complete search history.

(56) References Cited

U.S. PATENT DOCUMENTS

| | | |
|---|---|---|
| 3,729,710 A | 4/1973 | Sherwin |
| 6,257,264 B1 | 7/2001 | Sturman |
| 6,402,048 B1 | 6/2002 | Collins |
| 6,688,535 B2 | 2/2004 | Collins |
| 6,721,630 B1 | 4/2004 | Woytowitz |
| 6,763,287 B2 | 7/2004 | Brundisini |
| 6,812,826 B2 | 11/2004 | Buhler |

(Continued)

OTHER PUBLICATIONS

PCT; App. No. PCT/US2021/017895; International Search Report and Written Opinion dated Jun. 4, 2021.

*Primary Examiner* — Chad G Erdman
(74) *Attorney, Agent, or Firm* — Fitch, Even, Tabin & Flannery LLP

(57) ABSTRACT

In some embodiments, apparatuses and methods are provided herein useful to providing power and data to an irrigation device. In some embodiments, encoder for an irrigation control unit that provides power and data to an irrigation device over a multi-wire path comprises: an AC to DC converter to convert an input AC signal into a DC voltage; an AC signal generator to generate an output AC signal modulated with data; a control circuit to provide a modulation control signal to the AC signal generator to control generation and modulation of the output AC signal, the data modulated on the output AC signal comprising commands in accordance with irrigation programming; and a multi-wire interface coupled to the AC signal generator to electrically couple to a multi-wire path extending into a landscape and to which irrigation devices may be connected.

18 Claims, 29 Drawing Sheets

(56) References Cited

U.S. PATENT DOCUMENTS

| | | |
|---|---|---|
| 6,842,667 B2 | 1/2005 | Beutler |
| 6,993,416 B2 | 1/2006 | Christiansen |
| 7,069,115 B1 | 6/2006 | Woytowitz |
| 7,084,741 B2 | 8/2006 | Plummer |
| 7,181,319 B1 | 2/2007 | Woytowtiz |
| 7,182,272 B1 | 2/2007 | Marian |
| 7,225,037 B2 | 5/2007 | Shani |
| 7,245,991 B1 | 7/2007 | Woytowitz |
| 7,248,945 B2 | 7/2007 | Woytowitz |
| 7,269,829 B2 | 9/2007 | Smith |
| 7,289,886 B1 | 10/2007 | Woytowitz |
| 7,328,089 B2 | 2/2008 | Curren |
| 7,358,626 B2 | 4/2008 | Gardner |
| 7,398,139 B1 | 7/2008 | Woytowitz |
| 7,403,840 B2 | 7/2008 | Moore |
| 7,406,363 B2 | 7/2008 | Doering |
| 7,412,303 B1 | 8/2008 | Porter |
| 7,421,317 B2 | 9/2008 | Christiansen |
| 7,457,676 B1 | 11/2008 | Sutardja |
| 7,457,678 B2 | 11/2008 | Smith |
| 7,494,070 B2 | 2/2009 | Collins |
| 7,510,542 B2 | 3/2009 | Blight |
| 7,546,172 B1 | 6/2009 | Sutardja |
| 7,574,285 B2 | 8/2009 | Kah |
| 7,584,023 B1 | 9/2009 | Palmer |
| 7,606,637 B2 | 10/2009 | Habing |
| 7,613,546 B2 | 11/2009 | Nelson |
| 7,613,547 B1 | 11/2009 | Woytowitz |
| 7,619,322 B2 | 11/2009 | Gardner |
| 7,756,917 B2 | 7/2010 | DeHart |
| 7,772,726 B1 | 8/2010 | Porter |
| 7,778,736 B2 | 8/2010 | Sutardja |
| 7,792,612 B2 | 9/2010 | Kah |
| 7,844,368 B2 | 11/2010 | Alexanian |
| 7,853,363 B1 | 12/2010 | Porter |
| 7,877,168 B1 | 1/2011 | Porter |
| 7,899,581 B1 | 3/2011 | Woytowitz |
| 7,916,458 B2 | 3/2011 | Nelson |
| 7,930,069 B2 | 4/2011 | Savelle |
| 7,953,517 B1 | 5/2011 | Porter |
| 7,962,244 B2 | 6/2011 | Alexanian |
| 8,006,897 B1 | 8/2011 | Douglass |
| 8,014,904 B1 | 9/2011 | Woytowitz |
| 8,055,389 B2 | 11/2011 | Holindrake |
| 8,145,331 B2 | 3/2012 | Sutardja |
| 8,145,332 B2 | 3/2012 | Sutardja |
| 8,183,719 B2 | 5/2012 | Scripca |
| 8,271,144 B2 | 9/2012 | Kah |
| 8,274,171 B2 | 9/2012 | Korol |
| 8,275,309 B2 | 9/2012 | Woytowitz |
| 8,285,421 B2 | 10/2012 | Vander Griend |
| 8,301,309 B1 | 10/2012 | Woytoxitz |
| 8,352,088 B2 | 1/2013 | Christiansen |
| 8,374,710 B2 | 2/2013 | Sutardja |
| 8,374,726 B2 | 2/2013 | Holindrake |
| 8,396,603 B2 | 3/2013 | Savelle |
| 8,401,705 B2 | 3/2013 | Alexanian |
| 8,436,559 B2 | 5/2013 | Kidd |
| 8,458,307 B2 | 6/2013 | Seelman |
| 8,494,683 B2 | 7/2013 | Piper |
| 8,497,597 B2 | 7/2013 | Korol |
| 8,509,683 B2 | 8/2013 | Woytowitz |
| 8,538,592 B2 | 9/2013 | Alexanian |
| 8,548,632 B1 | 10/2013 | Porter |
| 8,600,569 B2 | 12/2013 | Woytowitz |
| 8,606,415 B1 | 12/2013 | Woytowitz |
| 8,615,329 B2 | 12/2013 | O'Connor |
| 8,619,819 B2 | 12/2013 | Seelman |
| 8,620,480 B2 | 12/2013 | Alexanian |
| 8,620,481 B2 | 12/2013 | Holindrake |
| 8,638,009 B2 | 1/2014 | Korol |
| 8,660,705 B2 | 2/2014 | Woytowitz |
| 8,681,610 B1 | 3/2014 | Mukerji |
| 8,700,222 B1 | 4/2014 | Woytowitz |
| 8,738,181 B2 | 5/2014 | Greer |
| 8,738,189 B2 | 5/2014 | Alexanian |
| 8,739,025 B2 | 5/2014 | Haila |
| 8,793,024 B1 | 7/2014 | Woytowitz |
| 8,796,879 B2 | 8/2014 | Korol |
| 8,874,275 B2 | 10/2014 | Alexanian |
| 8,878,465 B2 | 11/2014 | Kidd |
| 8,897,899 B2 | 11/2014 | Marsters |
| 8,901,771 B2 | 12/2014 | Mancebo Del Castillo Pagola |
| 8,924,032 B2 | 12/2014 | Woytowitz |
| 8,977,400 B1 | 3/2015 | Porter |
| 9,032,998 B2 | 5/2015 | O'Brien |
| 9,081,376 B2 | 7/2015 | Woytowitz |
| 9,128,489 B2 | 9/2015 | Bauman |
| 9,153,970 B2 | 10/2015 | Scripca |
| 9,155,254 B2 | 10/2015 | Edwards |
| 9,169,944 B1 | 10/2015 | Dunn |
| 9,192,110 B2 | 11/2015 | Standerfer |
| 9,301,461 B2 | 4/2016 | Woytowitz |
| 9,307,620 B2 | 4/2016 | Woytowitz |
| 9,439,369 B2 | 9/2016 | Christiansen |
| 9,538,713 B2 | 1/2017 | Pearson |
| 9,539,602 B2 | 1/2017 | Wright, III |
| 9,577,415 B1 | 2/2017 | Veloskey |
| 9,578,817 B2 | 2/2017 | Dunn |
| 9,590,537 B2 | 3/2017 | Pasche |
| 9,623,431 B2 | 4/2017 | Lichte |
| 9,665,106 B2 | 5/2017 | Lorenz |
| 9,678,485 B2 | 6/2017 | Malaugh |
| 9,756,797 B2 | 9/2017 | Sarver |
| 9,775,307 B2 | 10/2017 | Bartlett |
| 9,781,887 B2 | 10/2017 | Woytowitz |
| 9,786,422 B2 | 10/2017 | Edwards |
| 9,792,557 B2 | 10/2017 | Mathur |
| 9,817,380 B2 | 11/2017 | Bangalore |
| 9,870,887 B2 | 1/2018 | Woytowitz |
| 9,872,445 B2 | 1/2018 | Cline |
| 9,877,438 B2 | 1/2018 | Bermudez Rodriguez |
| 9,880,537 B2 | 1/2018 | Mewes |
| 9,889,458 B2 | 2/2018 | Lichte |
| 9,933,778 B2 | 4/2018 | Hamann |
| 9,939,297 B1 | 4/2018 | Eyring |
| 9,959,507 B2 | 5/2018 | Mathur |
| 9,986,696 B2 | 6/2018 | Halahan |
| 9,987,649 B2 | 6/2018 | Wright, III |
| 10,010,031 B1 | 7/2018 | Liu |
| 10,015,894 B2 | 7/2018 | Veloskey |
| 10,113,287 B2 | 10/2018 | Christiansen |
| 10,139,797 B2 | 11/2018 | Mewes |
| 10,166,565 B2 | 1/2019 | Lemkin |
| 10,225,996 B1 | 3/2019 | Kremicki |
| 10,228,711 B2 | 3/2019 | Woytowitz |
| 10,231,391 B2 | 3/2019 | Standerfer |
| 10,278,181 B2 | 4/2019 | Hall |
| 10,285,344 B2 | 5/2019 | Stange |
| 10,306,844 B1 | 6/2019 | Levine |
| 10,328,444 B2 | 6/2019 | Wright, III |
| 10,359,788 B2 | 7/2019 | Gutierrez |
| 10,368,503 B2 | 8/2019 | Kah, Jr. |
| 10,374,931 B2 | 8/2019 | Hall |
| 10,409,296 B1 | 9/2019 | Elle |
| 10,425,248 B2 | 9/2019 | Tulliano |
| 10,448,585 B2 | 10/2019 | Kundra |
| 10,512,227 B2 | 12/2019 | Rainone |
| 10,542,684 B2 | 1/2020 | Pearson |
| 10,556,248 B2 | 2/2020 | Wright, III |
| 10,654,061 B2 | 5/2020 | Lichte |
| 10,743,482 B2 | 8/2020 | Standerfer |
| 10,779,484 B2 | 9/2020 | Halahan |
| 10,853,894 B2 | 12/2020 | Rupp |
| 10,918,030 B2 | 2/2021 | Woytowitz |
| 10,925,225 B1 | 2/2021 | Andaya |
| 10,939,626 B2 | 3/2021 | Kremicki |
| 10,945,109 B2 | 3/2021 | Nies |
| 11,039,582 B2 | 6/2021 | Gilliam |
| 11,043,795 B2 | 6/2021 | Pignato |
| 11,053,652 B2 | 7/2021 | Christiansen |
| 2002/0091452 A1 | 7/2002 | Addink |
| 2004/0011408 A1* | 1/2004 | Campbell ........... F16K 37/0041 137/554 |

(56) References Cited

U.S. PATENT DOCUMENTS

| | | |
|---|---|---|
| 2004/0233973 A1 | 11/2004 | Fullerton |
| 2009/0135629 A1* | 5/2009 | Mancebo del Castillo Pagola ..... H02M 5/42 363/34 |
| 2009/0138132 A1 | 5/2009 | Collins |
| 2010/0270803 A1* | 10/2010 | Irwin ................... H02K 7/1823 290/54 |
| 2014/0005843 A1 | 1/2014 | Thomas |
| 2014/0031996 A1 | 1/2014 | Nickerson |
| 2015/0245568 A1 | 9/2015 | O'Brien |
| 2017/0167630 A1* | 6/2017 | Ferrer Herrera ...... H01F 7/1844 |
| 2018/0199525 A1 | 7/2018 | Cline |
| 2018/0279429 A1* | 9/2018 | Sadwick ............ H05B 45/3725 |
| 2018/0295796 A1* | 10/2018 | Woytowitz .............. G05F 1/445 |
| 2019/0150381 A1 | 5/2019 | Tennyson |
| 2019/0224402 A1 | 7/2019 | Henry |
| 2019/0242494 A1 | 8/2019 | Ferrer Herrera |
| 2019/0261555 A1 | 8/2019 | Baldwin |
| 2019/0261584 A1 | 8/2019 | Olive-Chahinian |
| 2019/0275551 A1 | 9/2019 | Renquist |
| 2019/0364752 A1 | 12/2019 | Marsters |
| 2020/0044759 A1 | 2/2020 | Carter |
| 2021/0144940 A1 | 5/2021 | Woytowitz |
| 2021/0270911 A1* | 9/2021 | Kageyama ........... H02H 7/0838 |

* cited by examiner

POWER SUPPLY USING CONVENTIONAL TRANSFORMER

2-WIRE DRIVER - H-BRIDGE WITH CURRENT MEASUREMENT

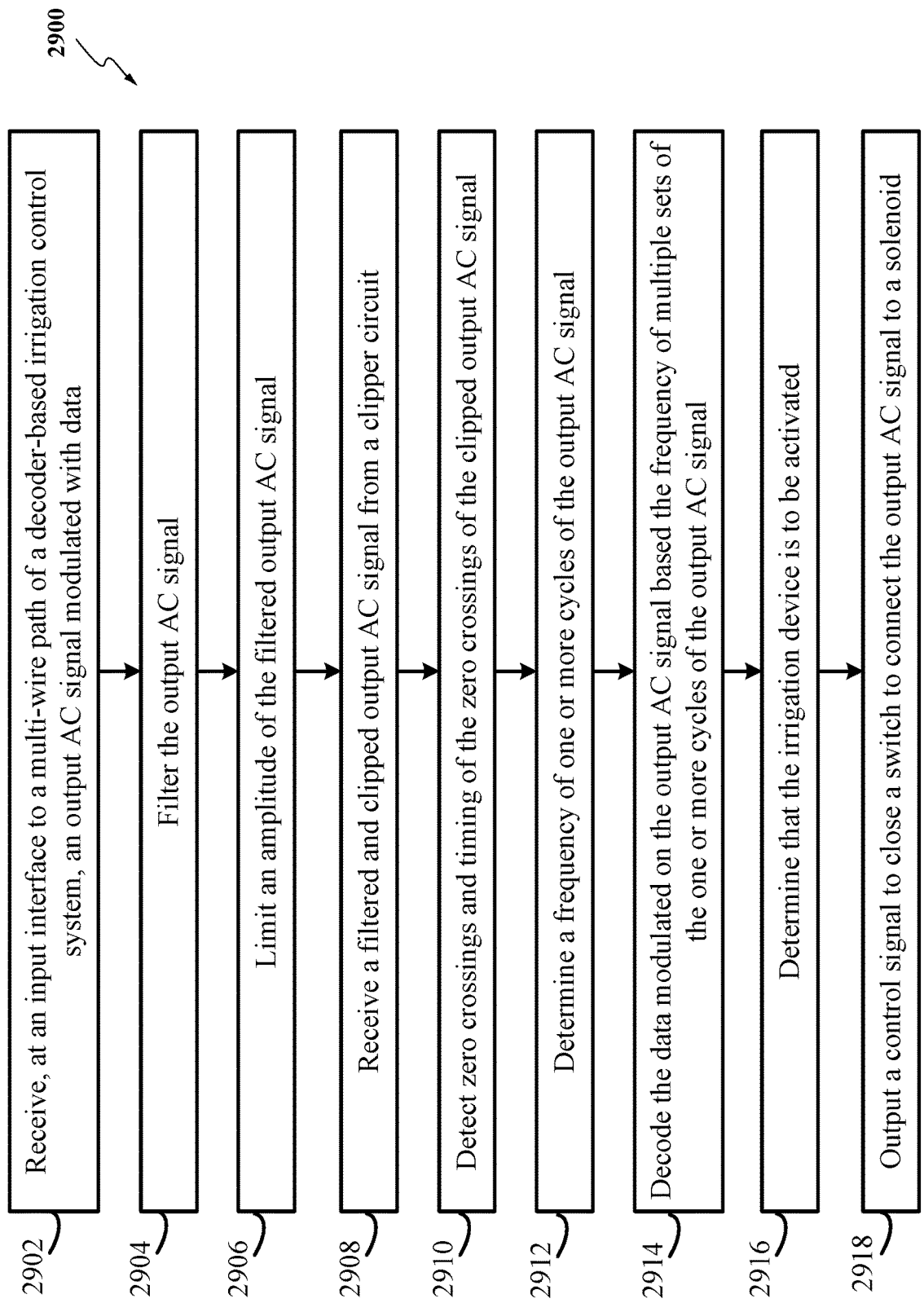

US 11,357,181 B2

DATA MODULATED SIGNAL GENERATION IN A MULTI-WIRE IRRIGATION CONTROL SYSTEM

CROSS-REFERENCE TO RELATED APPLICATION

This application claims the benefit of U.S. Provisional Application No. 62/975,390 filed Feb. 12, 2020, entitled DATA MODULATED SIGNAL GENERATION IN A MULTI-WIRE IRRIGATION CONTROL SYSTEM, which is incorporated herein by reference in its entirety.

TECHNICAL FIELD

This invention relates generally to irrigation control, and more particularly to the controlling irrigation using a multi-wire path that provides power and data to irrigation devices.

BACKGROUND

Decoder-based irrigation systems are generally understood in the irrigation arts. In these systems, a two-wire path extends from an encoder into the field and various decoders are coupled to two-wire path. The decoders are typically coupled to solenoid activated valves. The encoder outputs a power signal on the two-wire path. The power signal is modulated with data in order to address and provide control signals to the decoders. In some known systems, the power signal is an AC power signal that is modulated by selectively clipping the positive half signal. The decoders in the field derive their operational power from the AC signal and decoder the data to determine if they are being addressed and to take any actions indicated by the data.

BRIEF DESCRIPTION OF THE DRAWINGS

Disclosed herein are embodiments of systems, apparatuses and methods pertaining to providing power and data to one or more irrigation devices. This description includes drawings, wherein:

FIG. 29 is a flow diagram of an exemplary method of receiving power and data from an irrigation control unit over a multi-wire path.

Figure 1:
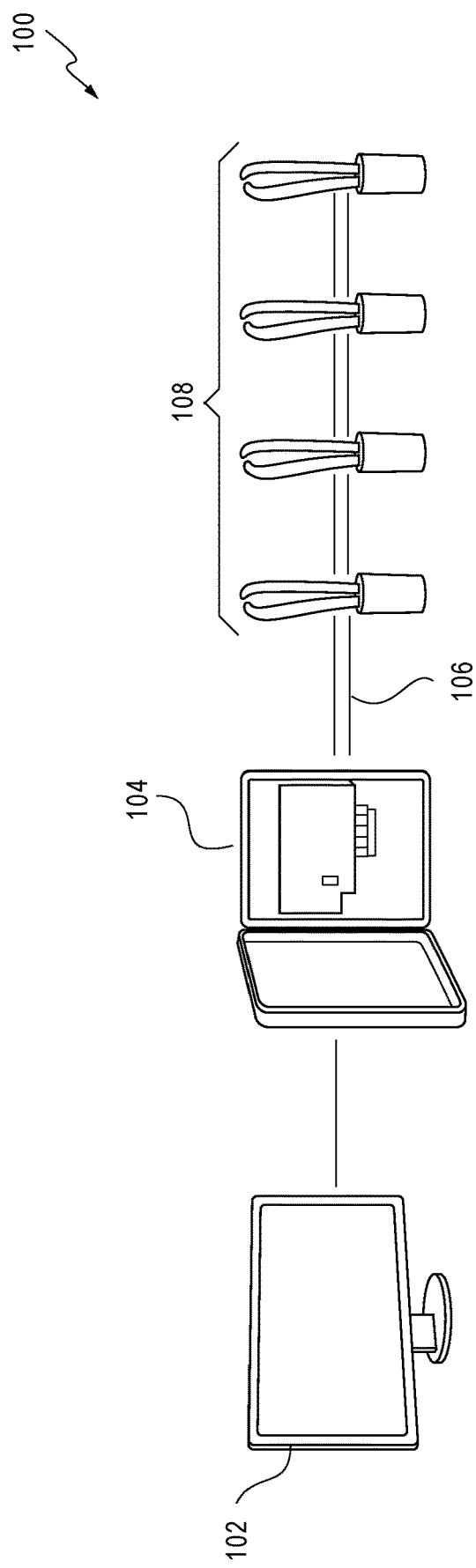
FIG. 1 illustrates a simplified block diagram of an exemplary central control-based irrigation system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for providing power and data to an irrigation device. In some embodiments, an encoder for an irrigation control unit that provides power and data to an irrigation device over a multi-wire path comprises: an AC to DC converter configured to convert an input AC signal into a DC voltage; an AC signal generator coupled to the AC to DC converter, the AC signal generator configured to generate an output AC signal modulated with data; the control circuit coupled to the AC signal generator and configured to: provide a modulation control signal to the AC signal generator to control generation and modulation of the output AC signal, the data modulated on the output AC signal comprising commands in accordance with irrigation programming; and a multi-wire interface coupled to the AC signal generator and configured to electrically couple to a multi-wire path extending into a landscape and to which irrigation devices may be connected.

In some embodiments, a decoder unit for an irrigation system that receives power and data from an irrigation control unit over a multi-wire path comprises: an input interface configured to couple to a multi-wire path of a decoder-based irrigation control system and to receive an output AC signal modulated with data and transmitted by an encoder of an irrigation control unit over the multi-wire path; a switch coupled to the input interface and configured to couple to a solenoid of an irrigation device; a decoder circuit connected to the input interface and comprising a control circuit is configured to: decode the data from the received output AC signal input to the decoder circuit; determine, from the decoded data, that the irrigation device is to be activated; and output a control signal to the switch to cause the switch to close and connect the output AC signal to the solenoid; and a current measure circuit coupled to the switch and configured to measure a current of the output AC signal passing through the switch and being drawn by the solenoid and provide a first output signal comprising the measure of the current to the control circuit; and wherein the control circuit is further configured to determine, based on the measure of the current, whether the solenoid is operating properly or whether a ground short condition exists.

In some embodiments, a decoder unit for an irrigation system that receives power and data from an irrigation control unit over a multi-wire path comprises: an input interface configured to couple to a multi-wire path of a decoder-based irrigation control system and to receive an output AC signal modulated with data and transmitted by an encoder of an irrigation control unit over the multi-wire path, wherein the modulation of the output AC signal comprises selective modulation of a frequency of one or more cycles of the output AC signal to have a selectable one of a plurality of frequencies; a switch coupled to the input interface and configured to couple to a solenoid of an irrigation device; a decoder circuit coupled to the input interface, the decoder circuit comprising: a filter coupled to the input interface and configured to filter the output AC signal; a clipper circuit coupled to an output of the filter, wherein the clipper circuit is configured to limit an amplitude of the filtered output AC signal; and a control circuit configured to: receive a filtered and clipped output AC signal from the clipper circuit; detect zero crossings and timing of the zero crossings of the filtered and clipped output AC signal; determine a frequency of one or more cycles of the output AC signal; decode the data modulated on the output AC signal based the frequency of multiple sets of the one or more cycles of the output AC signal; determine, from the decoded data, that the irrigation device is to be activated; and output a control signal to the switch to cause the switch to close and connect the output AC signal to the solenoid.

In some embodiments, a method for an irrigation control unit that provides power and data to an irrigation device over a multi-wire path comprises: converting, using an alternating current (AC) to direct current (DC) converter, an input AC signal into a DC voltage; providing, by a control circuit, a modulation control signal to control generation of an output AC signal and modulation of data on the output AC signal, the data comprising commands in accordance with irrigation programming; generating, by the AC signal generator, the output AC signal modulated with the data based on the DC voltage and the modulation control signal; and outputting, via a multi-wire interface coupled to the AC signal generator, the output AC signal to a multi-wire path extending into a landscape and to which irrigation devices are connected.

In some embodiments, method for a decoder unit of an irrigation system that receives power and data from an irrigation control unit over a multi-wire path comprises: receiving, at an input interface of the decoder unit coupled to the multi-wire path of a decoder-based irrigation control system, an output AC signal modulated with data and having been transmitted by the irrigation control unit over the multi-wire path; decoding, by a control circuit of a decoder circuit of the decoder unit, the data from the output AC signal; determining, by the control circuit and from the decoded data, that an irrigation device is to be activated; outputting, by the control circuit, a control signal to cause a switch to close and connect the output AC signal to a solenoid of the irrigation device; measuring, by a current measure circuit coupled to the switch, a current of the output AC signal passing through the switch and being drawn by the solenoid; providing, by the current measure circuit, a first output signal comprising the measure of the current to the control circuit; and determining, by the control circuit and based on the measure of the current, whether one of the solenoid is operating properly and whether a ground short condition exists.

In some embodiments, method for a decoder unit of an irrigation system that receives power and data from an irrigation control unit over a multi-wire path comprises: receiving, at an input interface of the decoder unit coupled to the multi-wire path of a decoder-based irrigation control system, an output AC signal modulated with data and having been transmitted by the irrigation control unit over the multi-wire path, wherein the output AC signal is modulated with the data through a selective modulation of a frequency of one or more cycles of the output AC signal to have a selectable one of a plurality of frequencies; limiting, by a clipper circuit of a decoder circuit of the decoder unit, an amplitude of the output AC signal; receiving, at a control circuit of the decoder circuit, a clipped output AC signal from the clipper circuit; detecting, by the control circuit, zero crossings and timing of the zero crossings of the clipped output AC signal; determining, by the control circuit, a frequency of one or more cycles of the output AC signal based on the zero crossings and the timing of the zero crossings; decoding, by the control circuit, the data modulated on the output AC signal based the frequency of multiple sets of the one or more cycles of the output AC signal; determining, by the control circuit and from the decoded data, that an irrigation device is to be activated; and outputting, by the control circuit, a control signal to a switch to cause the switch to close and connect the output AC signal to a solenoid of the irrigation device.

In some embodiments, a system for an irrigation control that provides power and data to a plurality of irrigation devices over a multi-wire path comprises: an irrigation control unit having an encoder, the encoder comprising: an alternating current (AC) to direct current (DC) converter configured to convert an input AC signal into a DC voltage; an AC signal generator coupled to the AC to DC converter, the AC signal generator configured to generate an output AC signal modulated with data; a control circuit coupled to the AC signal generator and configured to: provide a modulation control signal to the AC signal generator to control generation and modulation of the output AC signal, the data modulated on the output AC signal comprising commands in accordance with irrigation programming; and a multi-wire interface coupled to the AC signal generator and configured to output the output AC signal to the multi-wire path; the multi-wire path coupled to the multi-wire interface and extending into a landscape and to which the plurality of irrigation devices are connected; and the plurality of irrigation devices, each coupled to the multi-wire path at different portions thereof, wherein each of the irrigation devices comprises: an input interface configured to couple to the multi-wire path and to receive the output AC signal modulated with the data; a switch coupled to the input interface and configured to couple to a solenoid of the irrigation device; a decoder circuit connected to the input interface and comprising a control circuit, wherein the control circuit is configured to: decode the data from the output AC signal; determine, from the decoded data, that the irrigation device is to be activated; and output a control signal to the switch to cause the switch to close and connect the output AC signal to the solenoid.

In FIG. 1, a simplified block diagram of an exemplary central control-based irrigation system 100 is shown. By one approach, a central control-based irrigation system 100 includes a computer 102, although in a central control system, it is understood that the computer 102 can be a computer system, server or server system. The computer 102 may be at the irrigation site (landscape) or may be remote from the irrigation site. The computer 102 has central control irrigation control software installed thereon that can create and/or execute all irrigation schedules and programming. Often, the computer 102 generates schedules for hundreds of irrigation devices in the field. In some configurations, the computer 102 is coupled to one or more field interface devices or irrigation control units. FIG. 1 illustrates an irrigation control unit 104. The computer 102 may be coupled to the irrigation control unit 104 through various types of wired and/or wireless local area networks and/or wide area networks. The irrigation control unit 104 is the interface to the local irrigation devices in the field, such as decoders, sprinklers, sensors and so on. In a decoder-based system, the irrigation control unit 104 includes an encoder and a multi-wire output interface that electrically couple to a multi-wire path 106 that extends from the irrigation control unit 104 into the field. The multi-wire path 106 can extends tens or hundreds of meters. The multi-wire path 106 is typically a two-wire path; however, it is understood that this path may be a three or more wire path. The irrigation control unit 104 receives irrigation commands and/or irrigation schedules from the computer 102, and uses an encoder to encode or modulate data from these commands and/or schedules onto an output AC signal that is applied to the multi-wire path 106. The output AC signal provides power and control signaling over the multi-wire path 106 to any devices connected to the multi-wire path 106. As is common, various decoders 108 couple to the multi-wire path 106 at different locations in the field. These decoders 108 receive the AC signal and derive their operational power and decode or demodulate the data on the signal to determine if the data is intended for the particular device or not, and if it is, the device takes any action indicated by the data. For example, if the computer 102 intends that a given decoder 108 is to cause irrigation, the output AC signal is modulated with data to address the given decoder 108 and provide a turn on command. The given decoder 108 decodes data on the multi-wire path 106 and decodes the turn on command. The decoder then causes its connected solenoid activated valve to open allowing water flow to the sprinkler devices in the flow path of the valve. In a typical decoder-based control system, there may be tens or hundreds of decoders 108. Although only one multi-wire path 106 is shown in FIG. 1, it is understood that there may be more than one multi-wire path extending from the irrigation control unit 104.

Figure 2:
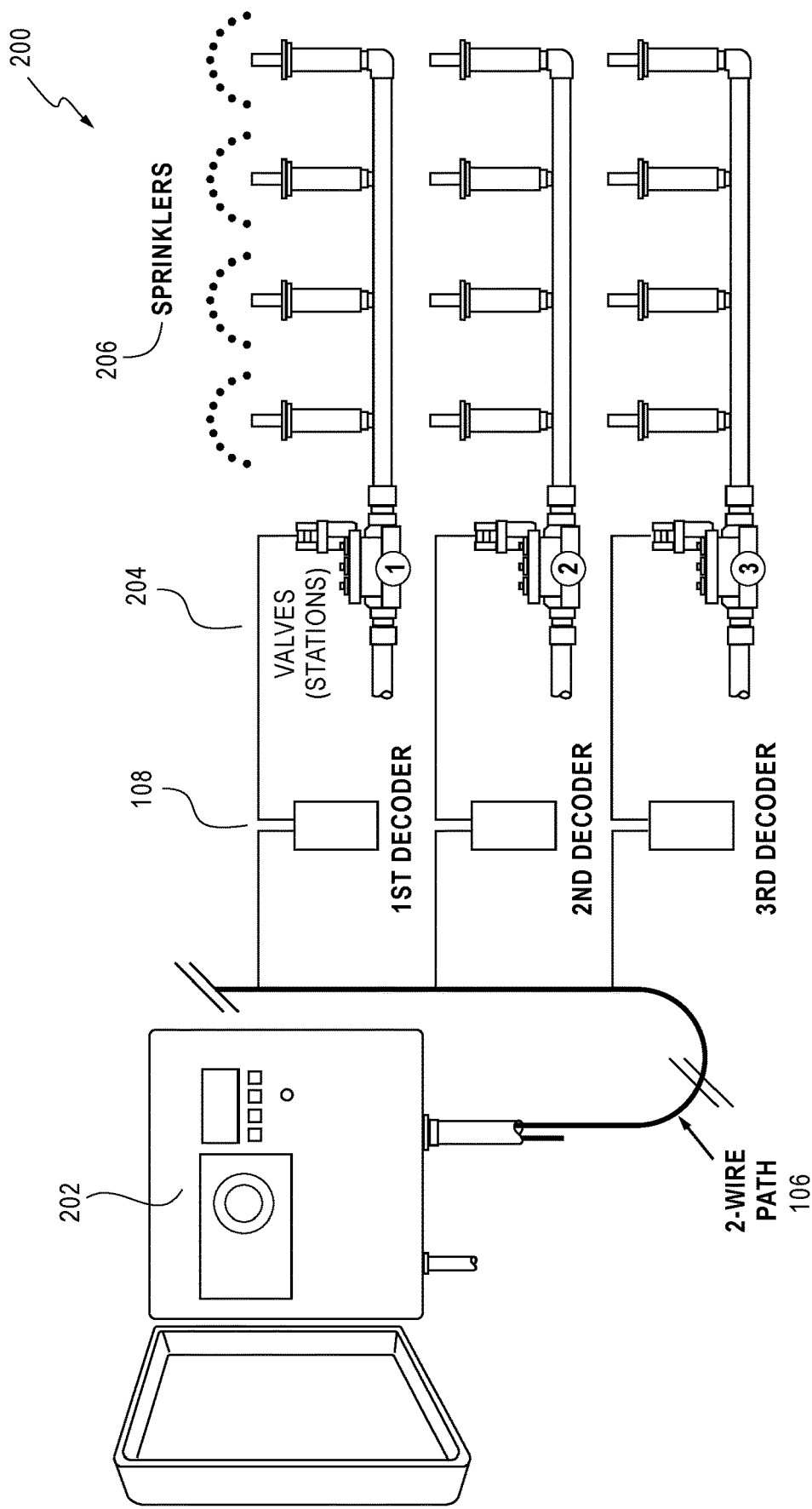
FIG. 2 illustrates a simplified block diagram of an exemplary irrigation controller-based irrigation system in accordance with some embodiments.

In FIG. 2, another simplified block diagram of an exemplary irrigation controller-based irrigation system 200 is shown. In this embodiment, a dedicated irrigation controller 202 includes all functionality to generate and execute irrigation schedules with user input. That is, the controller 202 includes a user interface (e.g., rotary dial, buttons, display screen, and so on) and includes programming (e.g., firmware stored in memory of the controller). Thus, in some embodiments, the functionality of the computer 102 and irrigation control unit 104 may be implemented in the irrigation controller 202. For example, the irrigation controller 202 includes an encoder that is configured to encode or modulate data based on the stored irrigation schedules and/or manual user commands onto an output AC signal that is applied to the multi-wire path 106 (e.g., a two-wire path as shown in FIG. 2). For example, the AC signal output over the multi-wire path 106 provides operational power to the decoders 108 and/or is modulated with data in order to address and instruct the decoders 108 according to the irrigation programming in the irrigation controller 202. Relative to the system of FIG. 1, FIG. 2 illustrates valves 204 (e.g., non-latching solenoid activated valves) coupled to the decoders 108. The valves 204 control water flow through a pressurized water pipe to sprinkler devices 206. In some embodiments, the valves 204 are referred to as stations. It is understood that there may be one or more valves 204 coupled to a given decoder 108. In some embodiments, the functionality of the irrigation controller is implemented in a front panel of the irrigation controller having the main control circuit board and microcontroller, and the functionality to interface with and encode signals for the multi-wire path 106 is provided in an encoder module that is electrically coupled to the front panel, the encoder module including the multi-wire interface connectors. A commercial example of a decoder-based irrigation controller is the Rain Bird ESP-LXD Series Two-Wire Decoder Controller. Additional decoder-based irrigation controllers are described in U.S. Patent Application Publication No. US2018/0242537, published Aug. 30, 2018 and entitled Method and Apparatus for Programming a Decoder-Based Irrigation Controller, and U.S. patent application Ser. No. 16/586,729, filed Sep. 27, 2019 and entitled Irrigation Controller with Relays, both of which are incorporated herein by reference.

In known decoder-based control systems, there are various ways to encode data onto the signal that is applied to a two-wire path. Many approaches involve selectively clipping an AC signal in order to encode data bits on the signal.

In accordance with several embodiments, circuits, systems and methods are provided to produce an output AC signal for the multi-wire path. In some embodiments, an input power signal is converted into a DC voltage, which is used to generate an AC signal modulated with data. For example, referring next to FIG. 3, a simplified block diagram is shown of an exemplary irrigation system 300 that includes an irrigation control unit 318 including an encoder (encoder circuit) that generates an AC signal that is applied to the multi-wire path 106. By one approach, the irrigation control unit 318 includes an encoder 312 having an AC to DC converter 304, a control circuit 305 and an AC signal generator 306. In some embodiments, an input AC power signal 302 is coupled to the AC to DC converter 304 which outputs a DC voltage 314. In one configuration, the input AC signal 302 may be a 120 VAC signal and/or 240 VAC signal at 50 Hz and/or 60 Hz. It is understood that the characteristics of the input AC signal 302 will depend on the power source and can have any suitable voltage level and frequency. It is further understood that the input AC signal 302 may be a power signal input into the irrigation control unit 318 (e.g., from the wall) or may be a stepped down or transformed power signal. The DC voltage 314 output by the AC to DC converter 304 is input to the AC signal generator 306. For example, the DC voltage may be at any suitable level, such as at 24, 40, 48 volts DC. The value of the DC voltage will vary depending on the requirements of the system.

The AC to DC converter 304 is coupled to a control circuit 305 which is also coupled to the AC signal generator 306. The control circuit 305 is a processor-based device including one or more processors, and operates with one or more integrated or connected memories. The control circuit 305 and the memory may be integrated together, such as in a microcontroller, application specification integrated circuit, field programmable gate array or other such device, or may be separate devices coupled together. Generally, the control circuit 305 can comprise a fixed-purpose hard-wired platform or can comprise a partially or wholly programmable platform. These architectural options are well known and understood in the art and require no further description here. And generally, the control circuit 305 is configured (for example, by using corresponding software and/or firmware programming as will be well understood by those skilled in the art) to carry out one or more of the steps, actions, and/or functions described herein. For example, in some embodiments, the control circuit 305 controls operation of the encoder 312 and/or the irrigation control unit 318, and outputs signaling to the AC signal generator 306 to control the waveform of the output AC signal 316 provided to the multi-wire path 106.

In some embodiments, under control by the control circuit, the AC signal generator 306 creates a modulated output signal having any desired signal characteristics or modulation technique. The output AC signal 316 is coupled to the multi-wire path 106 at a multi-wire path connector or multi-wire path interface 307. In some embodiments, the output AC signal 316 provides operational power to the irrigation devices (e.g., decoders 308) coupled to the multi-wire path 106, in such case, the output AC signal may also be referred to as an AC power signal. In some embodiments, the output AC signal 316 is modulated with data but does not provide operational power, i.e., the devices connected to the multi-wire path receive their operational power in other ways, such as through battery power or connection to a different power supply.

Figure 3:
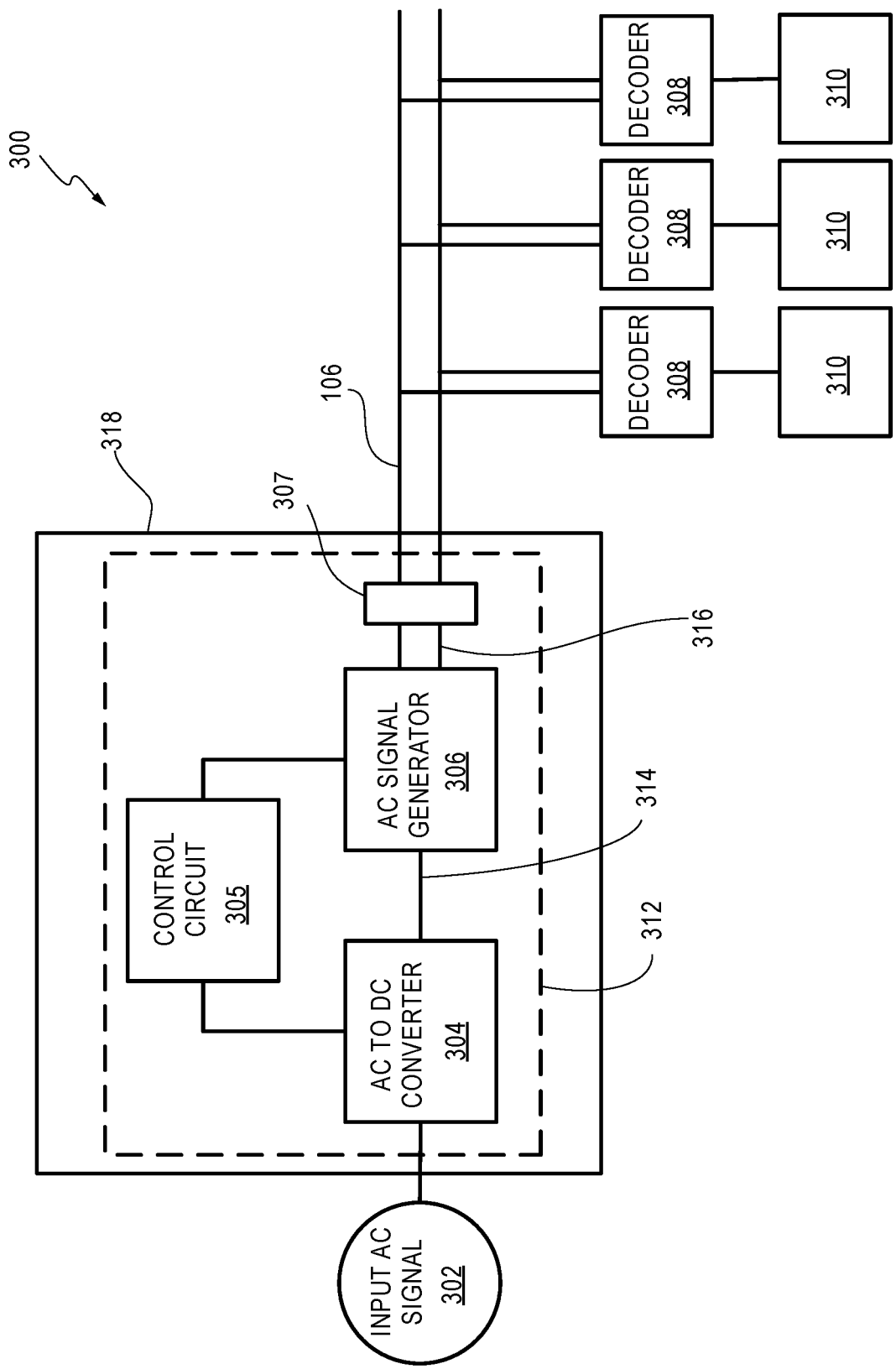
FIG. 3 illustrates a simplified block diagram of an exemplary irrigation system including an irrigation control unit with an encoder in accordance with some embodiments.

One or more irrigation control devices are connected to the multi-wire path 106 at variously locations about the length of the path 106. As illustrated in FIG. 3, these irrigation control devices are shown as decoders 308 (which may also be referred to as demodulators). The decoders 308 derive operational power from the received signal and decode the data from the signal to determine if they are addressed and receive and execute any received commands.

Depending on the signaling output from the control circuit 305, the output AC signal 316 provided by the AC signal generator 306 may be modulated in any number of ways. In some embodiments, the output AC signal is one or more of amplitude, frequency, and phase modulated with data.

Figure 24:
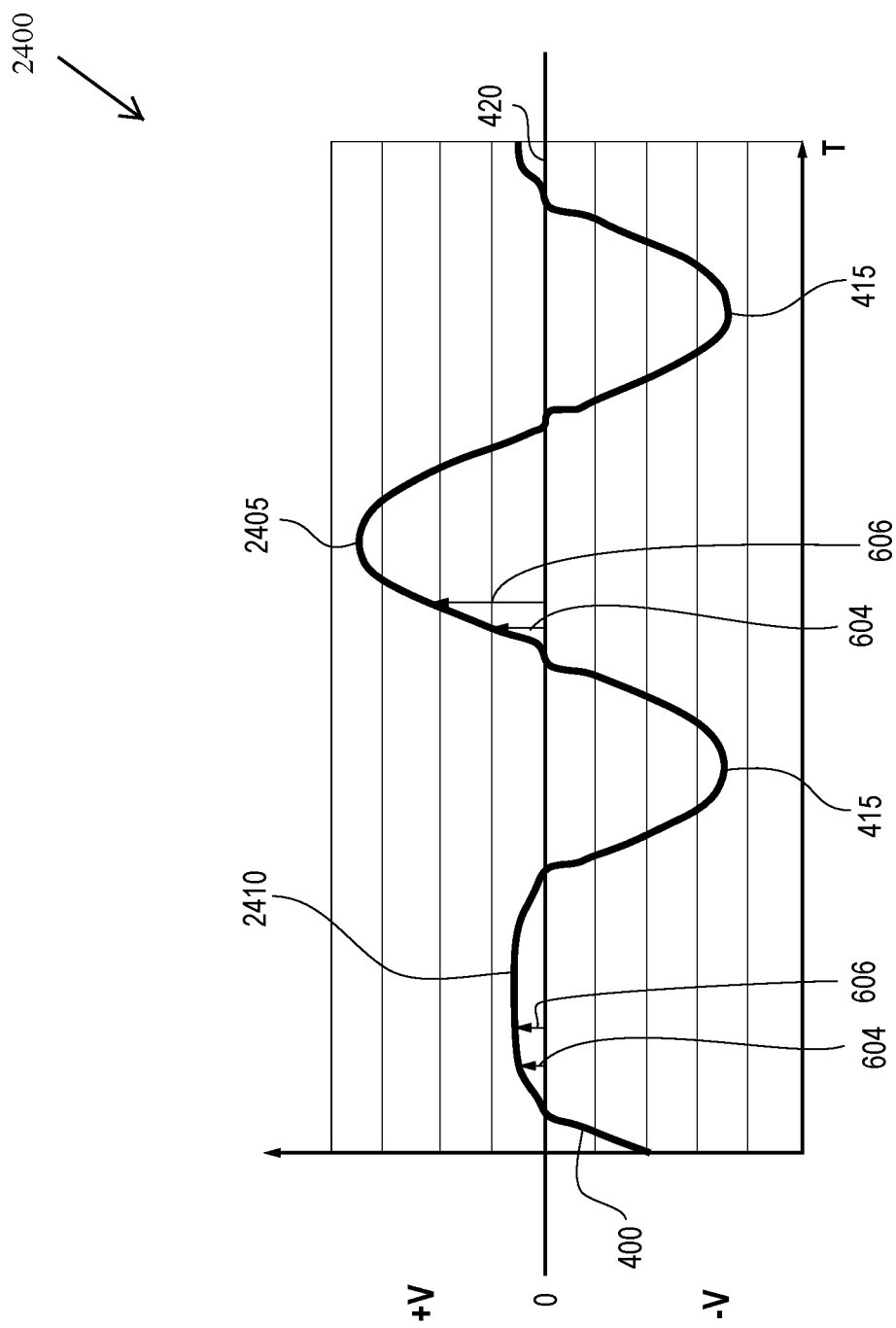
FIG. 24 is an exemplary output AC signal modulated with data by selectively clipping a positive portion of the signal in accordance with some embodiments.
Figure 25:
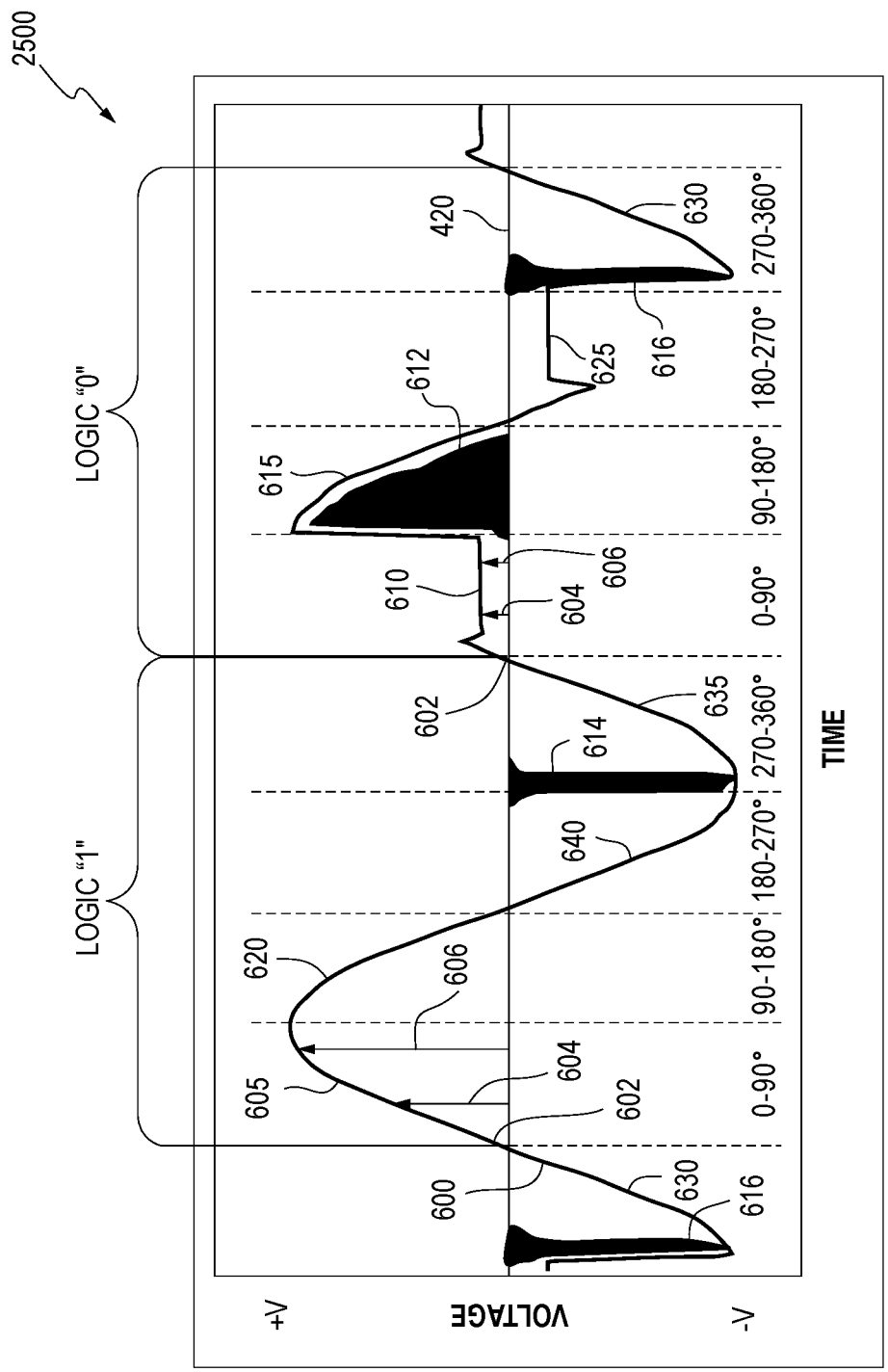
FIG. 25 is an exemplary output AC signal modulated with data by selectively clipping a first quadrant portion of the signal in accordance with some embodiments.

In some embodiments, the output AC signal applied to the multi-wire path 106 is amplitude modulated by selectively clipping or attenuating portions of the signal waveform. For example, in some embodiments, as shown in the output AC signal 2400 of FIG. 24, the first half of the waveform (0-180 degrees) is selectively clipped to encode data bits. That is, clipped portion 2410 represents one data bit and unclipped portion 2405 represents another data bit. In another example, in some embodiments, as shown in the output AC signal 2500 of FIG. 25, the first quadrant of the waveform (0-90 degrees) is selectively clipped to encode data bits. That is, clipped portion 610 represents one data bit (logic 0) and unclipped portion 605 represents another data bit (logic 1). When clipping the amplitude of the output AC signal, it is understood that care should be taken to ensure balancing the waveform and ensuring a negative bias in the output AC signal to avoid or limit galvanic corrosion of the multi-wire path (e.g., clipping may be done on the negative side of the waveform for balancing, not shown). These output signals are described in more detail in U.S. Patent Application Publication No. US2018/0242537 which is incorporated herein by reference.

In some embodiments, the output AC signal is frequency modulated. For example, in some embodiments, the AC signal generator 306 creates a signal in which the frequency of one or more cycles of the signal is selectively changed to modulate data bits on the signal, e.g., using a frequency shift keying modulation. For example, as controlled by the control circuit 305, the AC signal generator 306 selectively changes the frequency of each cycle of the AC signal (at the start of each cycle) to one of two or more values, e.g., 55 and 65 Hz, thereby outputting a modulated output AC signal 316 over the multi-wire path 106. In some embodiments, the decoders 308 determine whether each cycle is at 55 Hz and/or 65 Hz to extract the corresponding 1 or 0 data bit. In an illustrative non-limiting example, by using frequencies close to 60 Hz, the modulated signal may power the decoders 308 and any connected irrigation components 310, such as latching or non-latching solenoids, sensors, and so on. Various embodiments of frequency modulated output AC signals are shown in FIGS. 19-23 which are described further below. In some embodiments, the output AC signal having been frequency modulated inherently provides a balanced waveform that does not need a negative bias, and thus, is immune to galvanic corrosion on the transmission medium.

In some embodiments, the output AC signal is phase modulated. For example, in some embodiments, the AC signal generator 306 may create a signal in which the phase of one or more cycles of the signal is selectively changed to modulate data bits on the signal. For example, as controlled by the control circuit 305, the AC signal generator 306 selectively changes the phase of each cycle of the AC signal (at the start of each cycle) to be in phase or out of phase thereby outputting a modulated output AC signal 316 over the multi-wire path 106. Further details are described in FIGS. 32-35 and corresponding text of U.S. Pat. No. 10,228, 711, issued Mar. 12, 2019 and entitled Decoder Systems and Methods for Irrigation Control, which is incorporated herein by reference in its entirety.

Figure 4:
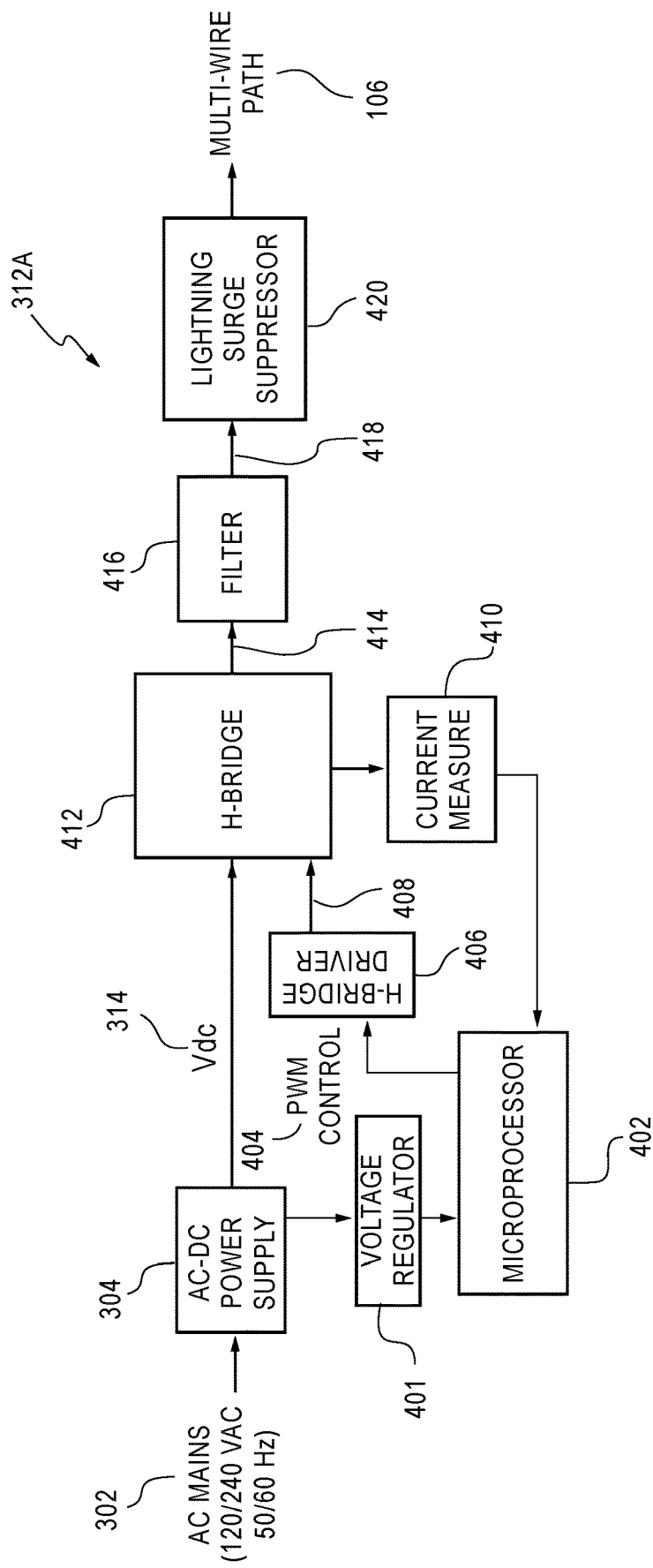
FIG. 4 illustrates a simplified block diagram of an exemplary encoder of an irrigation control unit using an H-bridge in accordance with some embodiments.

Referring next to FIG. 4, an exemplary encoder 312A of an irrigation control unit using an H-bridge is shown. In some embodiments, the encoder 312A may use any switching amplifiers, such as the H-bridge. In some implementations, the encoder 312A includes an H-Bridge circuit 412, an H-Bridge driver 406, a filter circuit 416 and a surge suppressor circuit 420 (lightning surge protector). In some implementations, the encoder 312A includes the AC to DC power supply 304 (AC to DC converter), a voltage regulator 401, and a microprocessor 402 (an example of the control circuit 305). In yet another implementation, the encoder 312A includes a current measure circuit 410. The AC to DC power supply 304 provides the DC voltage 314 to the H-Bridge circuit 412. The regulator 401 couples to the AC to DC power supply and provides operational DC power to the microcontroller 402. In some embodiments, the microprocessor 402 outputs a Pulse Width Modulation (PWM) signal 404 to the H-Bridge driver 406 which drives the H-bridge circuit 412 to produce an AC signal which is smoothed by the filter circuit 416 to provide the output AC signal for the multi-wire path 106. The surge suppressor circuit 420 is provided to protect the encoder 312A from lightning strikes or other surges on the multi-wire path 106. In FIG. 4, the H-Bridge driver circuit 406, the H-Bridge circuit 412 and the filter circuit 416 form one embodiment of the AC signal generator of FIG. 3.

In some embodiments, the encoder 312A includes a current measure circuit 410 coupled to the H-Bridge circuit 412 that can sense and measure the current being drawn by devices on the multi-wire path 106, e.g., in order to detect whether a decoder instructed to draw power to open a valve has in fact done so (i.e., did the solenoid turn on), and/or to detect data bits transmitted by the decoders through selectively altering the amount of current consumed by the decoders. The current measure circuit 410 provides an output to the microcontroller 402.

Figure 5:
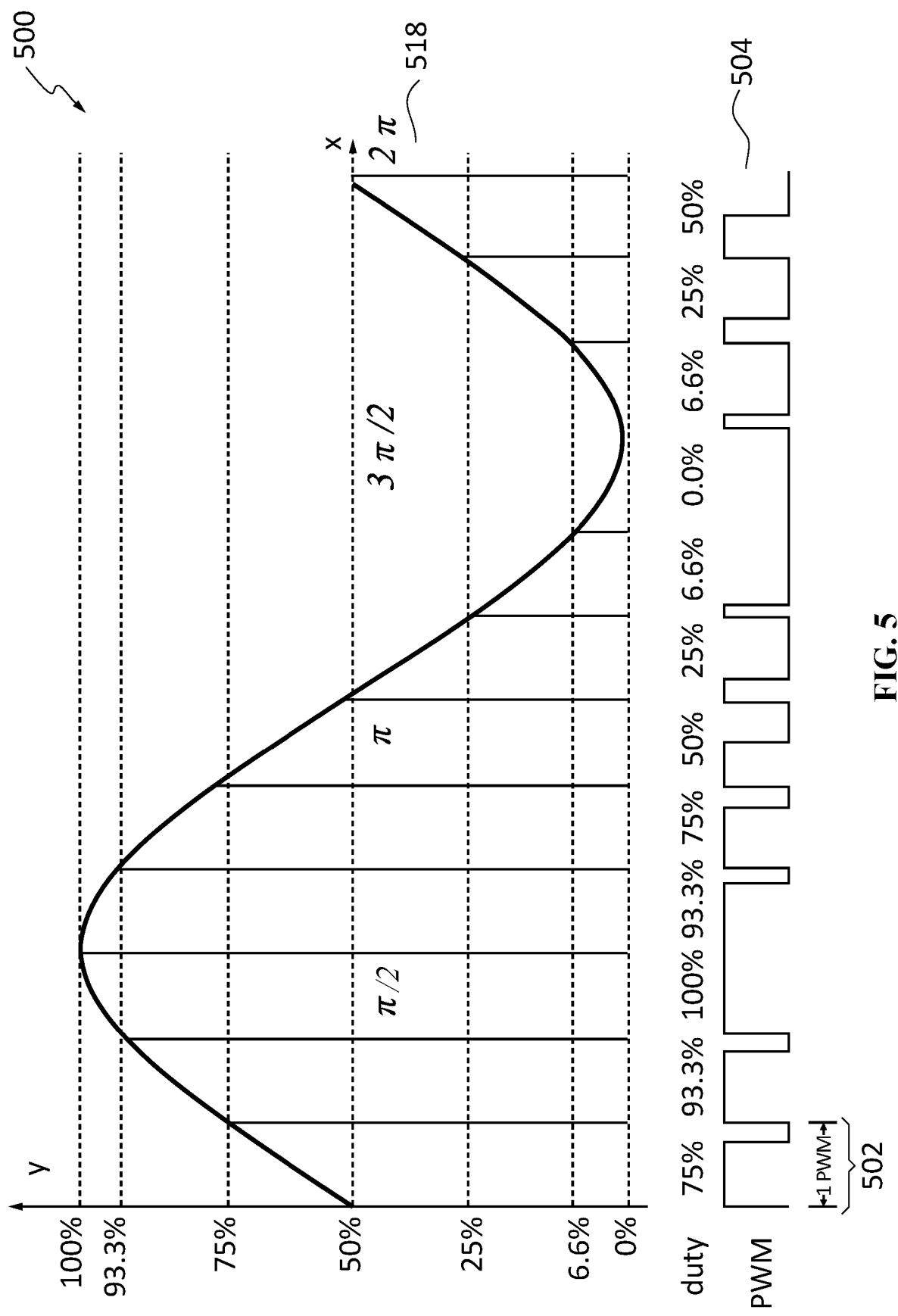
FIG. 5 illustrates an exemplary Pulse Width Modulation (PWM) signal and an output AC signal generated using the PWM signal in accordance with some embodiments.
Figure 6A:
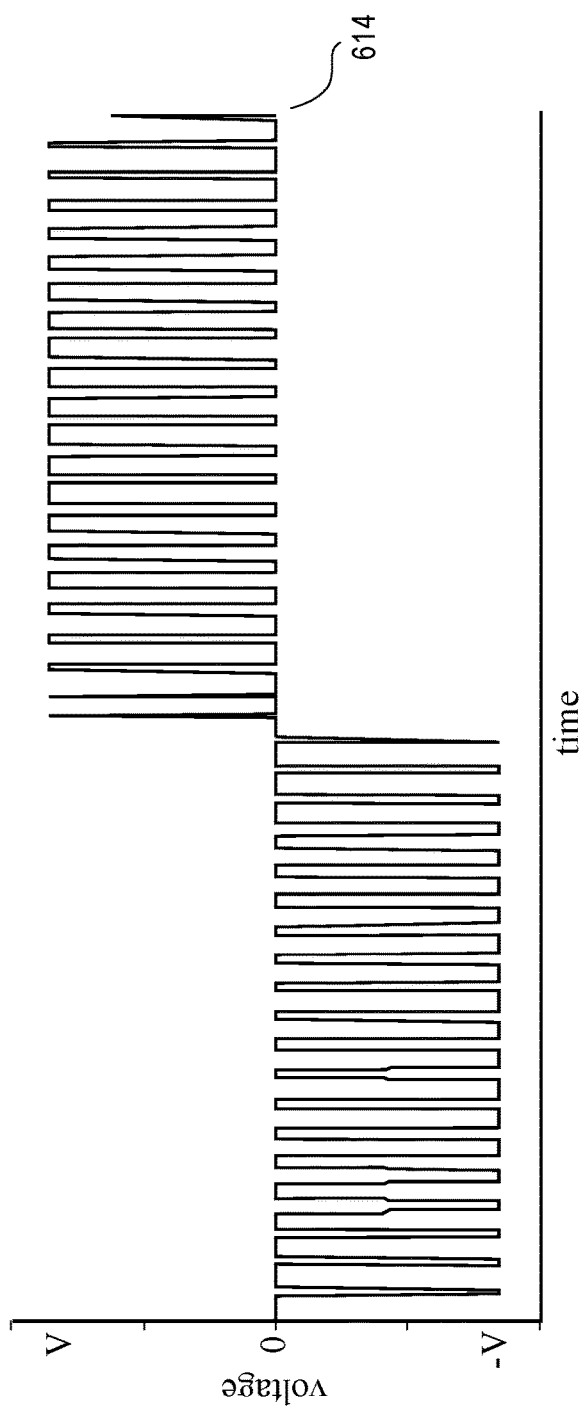
FIGS. 6A-6B illustrate exemplary output signals in accordance with some embodiments.

As stated above, the microprocessor 402 generates the PWM signal 404 to control the shape of the AC signal generated by the H-Bridge circuit 412. It is understood in the art how to generate a PWM signal to drive an H-Bridge circuit. In an illustrative non-limiting example, an exemplary PWM control signal 504 and corresponding filtered output AC signal 518 are shown in FIG. 5. The waveform of the output AC signal is changed by changing the duty and frequency of the PWM signal 504. The PWM signal 504 has cycles, see exemplary PWM cycle 502, each cycle having a pulse of a specified pulse width or duty. The width or duty of the pulses of the PWM signal 504 provides the amplitude of the waveform. The frequency of the PWM signal provides the length of time to complete one cycle 502 of the PWM signal 504. By changing the duty of the PWM signal 504 over a number of cycles 502, the shape of the AC signal can be controlled. In the example of FIG. 5, the PWM signal 504 results in a waveform having the form of a sine wave at a given frequency. In some embodiments, to modulate the frequency of the resulting AC signal, the PWM cycles 502 are either shortened at the same duty cycle (shorter time for a higher frequency) or lengthened at the same duty cycle (longer time for lower frequency). In this way, an AC signal can be created at a higher or lower frequency on a sine wave cycle-by-cycle basis. In some embodiments, the PWM control signal 504 is input to the H-Bridge driver circuit 406 which provides drive signals 408 to the components of the H-Bridge circuit 412. As such, the H-Bridge output signal 414 is based at least on the drive signals 408 and the DC voltage 314. Thus, the shape, amplitude, frequency and/or phase of the H-Bridge output signal 414 may be selectively modulated each period of the H-Bridge output signal 414 based on the PWM signal 404 output by the microprocessor 402. As is known in the art, depending on duty cycle frequency of the PWM signal 404, the resulting AC signal output from the H-Bridge circuit 412 appears as a pulse width modulated waveform showing varying duty cycle. See FIG. 6A, which shows an illustrative non-limiting example of an exemplary H-Bridge output signal 614 that is a pulse width modulated output waveform. This signal is then filtered to remove unwanted frequencies and smooth the waveform (e.g., using the filter circuit 416), resulting in the AC signal 618 having a sine wave form. See FIG. 6B which shows an illustrative non-limiting example of the waveform of the resulting AC signal 618.

Figure 6B:
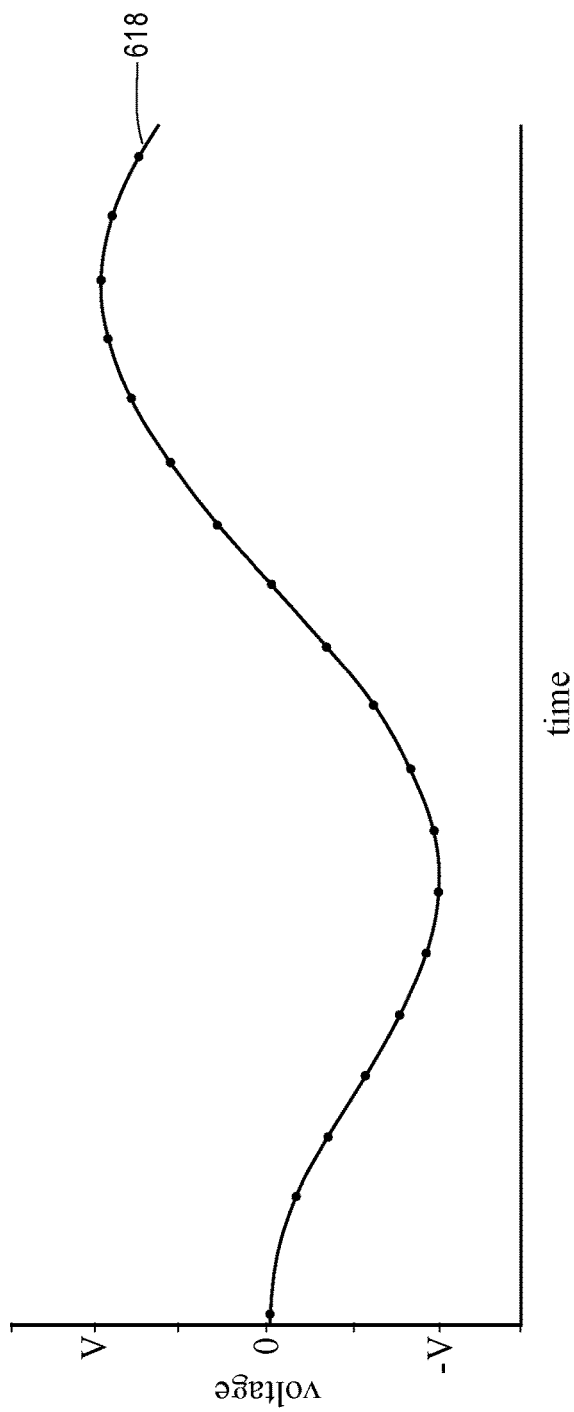

Alternatively or in addition to, in some embodiments, the H-Bridge output signal 414 passes through the filter circuit 416 to filter unwanted frequencies and smooth the waveform. For example, the filter circuit 416 may include a low pass filter (LPF). In one embodiment, the low pass filter may include one or more inductors L1, L2 and/or capacitors C1, such as shown in FIGS. 13-17. In an illustrative non-limiting example, exemplary output AC signals 518 and 618 are shown in FIGS. 5 and 6B. As such, the modulated signal 316 output over the multi-wire path 106 is a frequency modulated signal carrying power and/or data to the irrigation devices. In some embodiments, the current measure circuit 410 provides a signal to the microprocessor 402 that enables the microprocessor 402 to determine whether a given solenoid controlled by a decoder is ON or OFF. In one example, the current measure circuit 410 may include one or more differential op-amps and/or one or more resistors as shown in FIGS. 13-17. In such an example, the voltage signal output by the op-amp is input to the microprocessor 402 to determine whether the voltage corresponds to the solenoid being ON or OFF. In some embodiments, the microprocessor 402 is powered by the voltage signal output by the voltage regulator 401. In one embodiment, the voltage regulator 401 regulates the voltage input by the AC to DC power supply 304 to ensure that the DC voltage output to the microprocessor 402 is the voltage tolerated and/or usable by the microprocessor 402.

Figure 7:
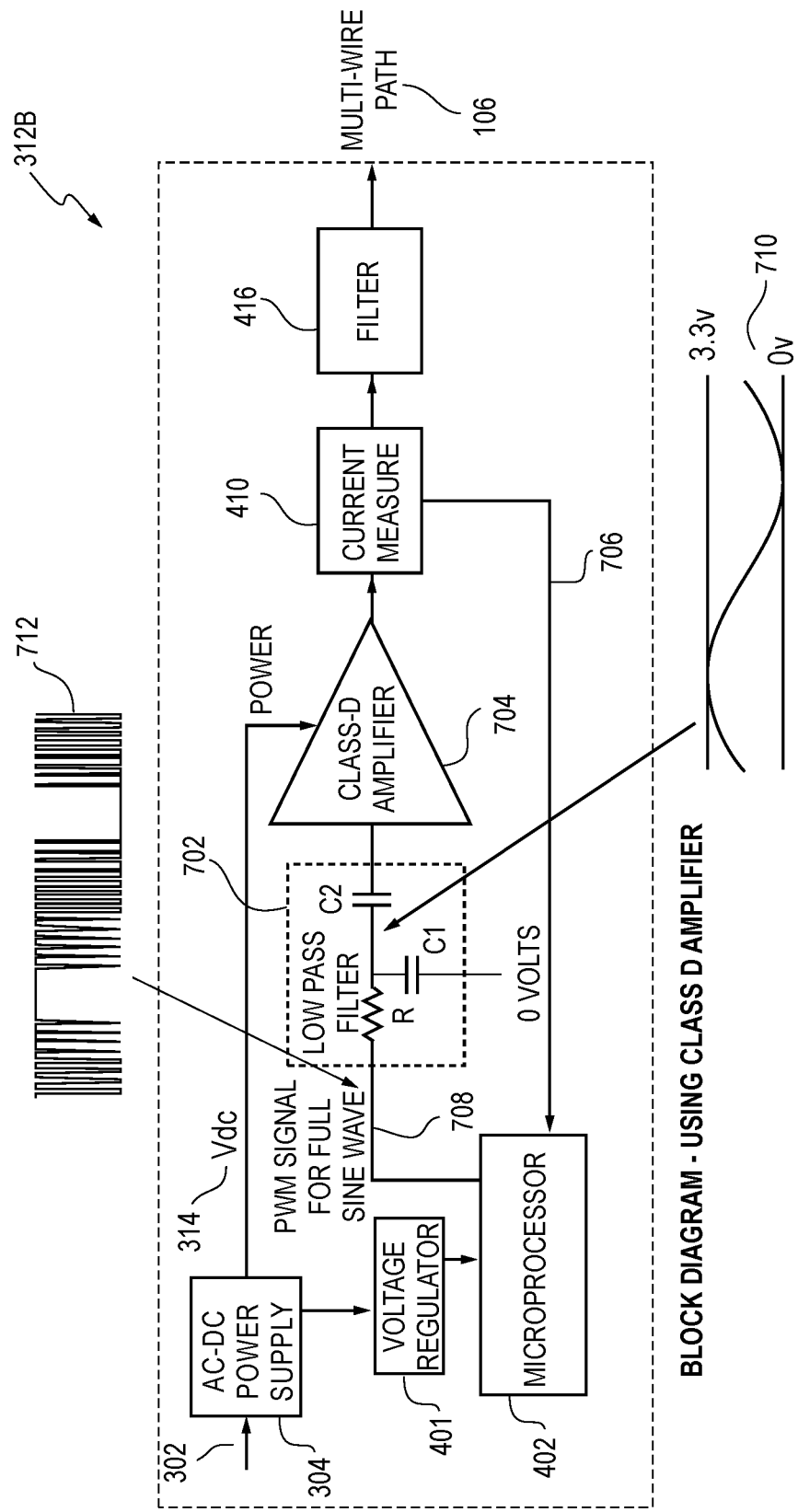
FIG. 7 illustrates a simplified block diagram of an exemplary encoder of an irrigation control unit using a Class D amplifier in accordance with some embodiments.

In FIG. 7, an exemplary encoder 312B of an irrigation control unit using a Class D amplifier (more generically referred to as a power amplifier, a digital amplifier or a switching amplifier) is shown. In some implementations, the encoder 312B includes a Class-D amplifier 704 and a low pass filter (LPF) 702. In one embodiment, the LPF 702 includes one or more resistors R and/or capacitors C1, C2. In some embodiments, the encoder 312B includes the filter circuit 416, the AC to DC power supply 304 (AC to DC converter), the voltage regulator 401 and the microprocessor 402. In some embodiments, the encoder 312B includes the current measure circuit 410 at the output of the Class-D amplifier. As shown, the AC to DC power supply 304 provides the DC voltage 314 to the Class-D amplifier 704. As shown, in some embodiments, the microprocessor 402 outputs a Pulse Width Modulation (PWM) signal 708 that passes through the LPF 702 to the Class-D amplifier 704. In an illustrative non-limiting example, an exemplary PWM signal 708 is shown as signal waveform 712 in FIG. 7. In the embodiments of FIG. 7, the signal waveform 712 is a lower voltage signal of the intended waveform (see waveform 710 being a sine wave oscillating between 0 and 3.3 volts) which is input into the Class-D amplifier which boosts the signal to a higher voltage and current (same frequency) using an internal H-Bridge circuit. In some embodiments, the output of the Class-D amplifier 704 passes through the current measure circuit 410 and the filter circuit 416 and is then output to the multi-wire path 106. As described above, the current measure circuit 410 senses and measures the current of the output AC signal and provides this as an input to the microprocessor 402 to determine whether the current indicates that the solenoid is ON or OFF.

Figure 8:
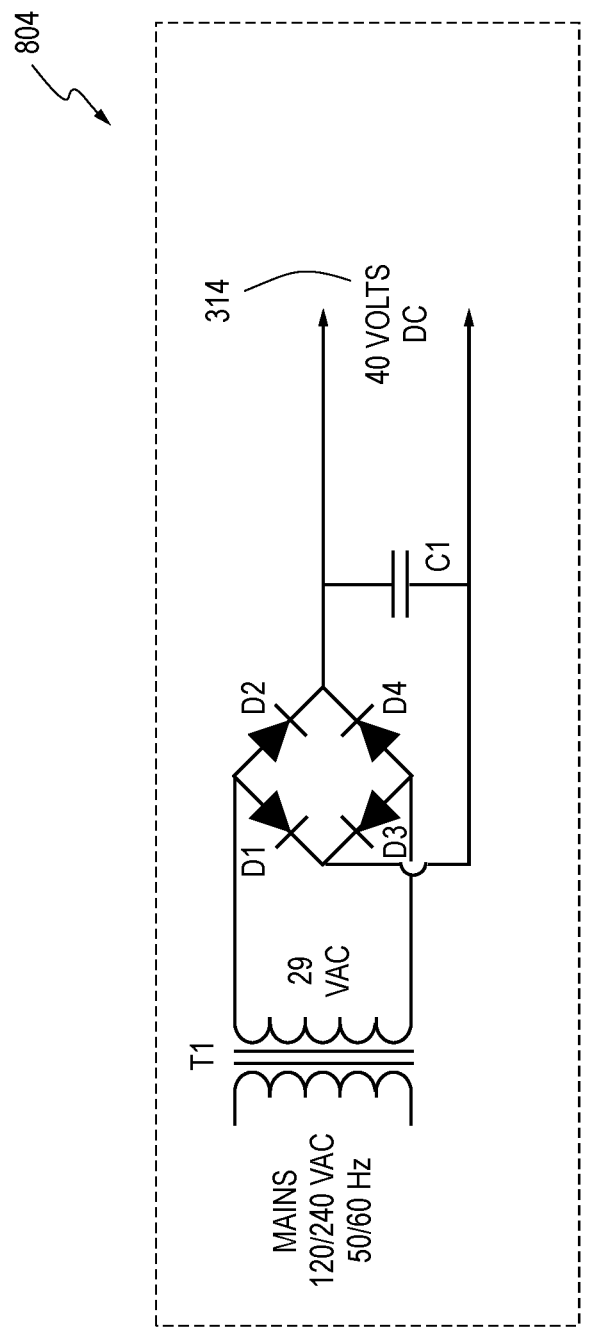
FIGS. 8-12 illustrate simplified block diagrams of exemplary AC to DC power supplies of an irrigation control unit in accordance with some embodiments.

In FIGS. 8-12, exemplary AC to DC power supplies 804, 904, 1004, 1104 and 1204 of an irrigation control unit are shown. In the embodiments of FIG. 8, the AC to DC power supply 804 includes a transformer T1 that receives the input AC signal and outputs a 29 VAC signal which is rectified to 40 volts DC. In an illustrative non-limiting example, the 40 volt DC is the DC voltage 314 input to the AC signal generator.

Figure 9:
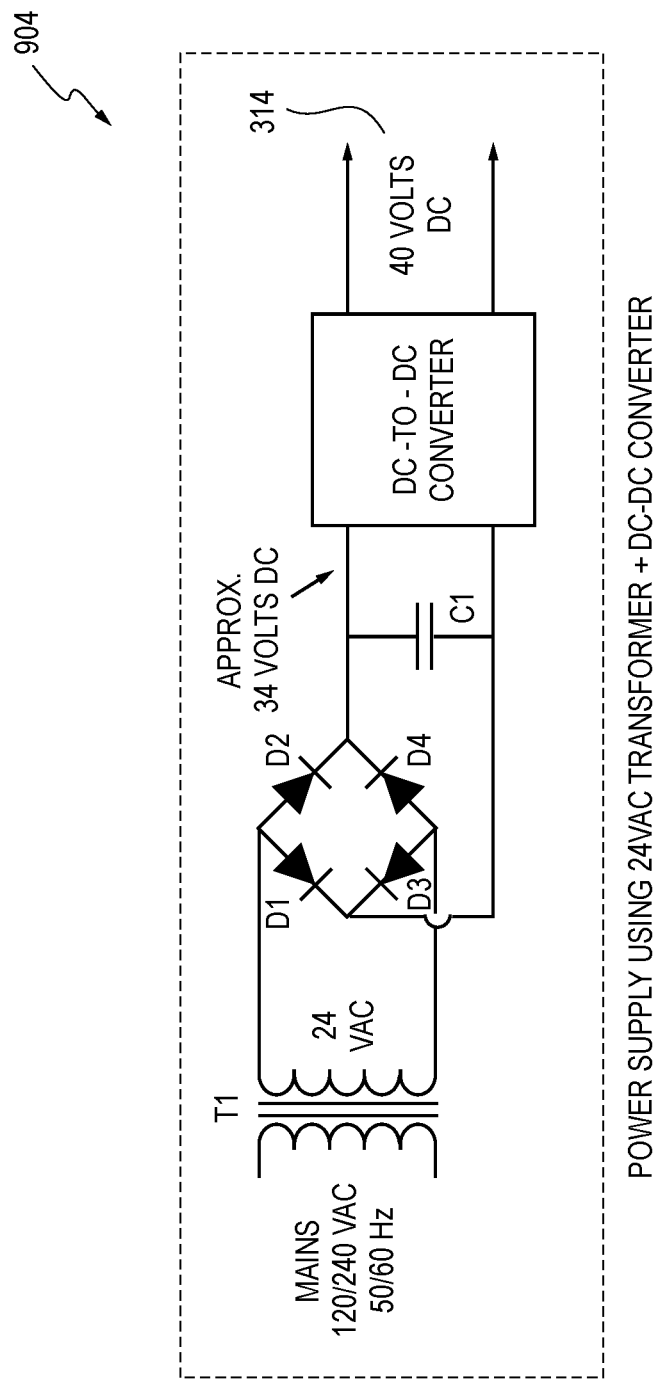

In the embodiments of FIG. 9, the AC to DC power supply 904 includes a transformer T1 that receives the input AC signal and outputs a 24 VAC signal that is rectified to substantially 34 volts DC. In this embodiment, the 34 volts DC is converted to 40 volts DC (by a DC-to-DC converter) that is input to the AC signal generator. In this embodiment, the AC signal generator needs a DC voltage at a higher level than that generated when rectifying the input AC signal.

Figure 10:
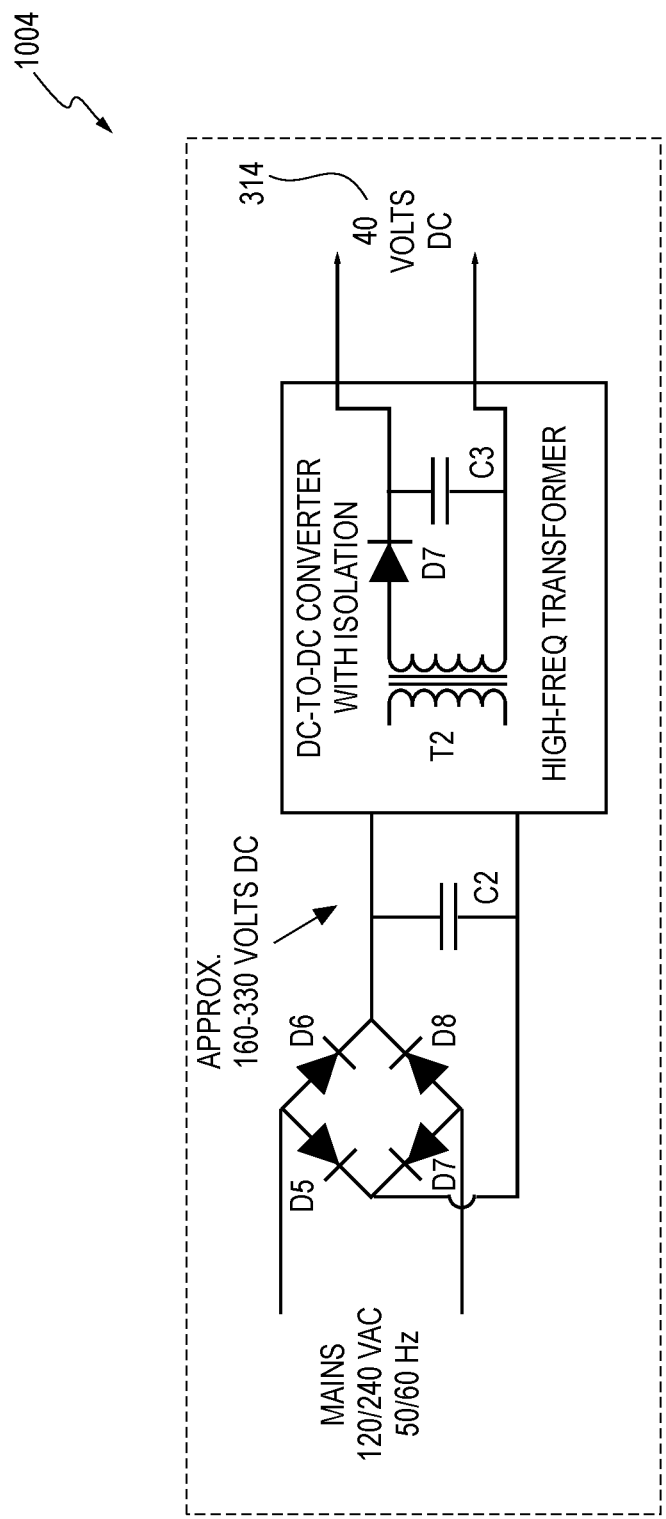

In the embodiments of FIG. 10, in the AC to DC voltage power supply 1004, the input AC signal is rectified to substantially between 160 and 330 volts DC and then subsequently converted to 40 volts DC using a DC-to-DC converter with isolation using a high speed transformer T2 to provide 40 volts DC. This allows the connection of a universal input AC power signal (the power supply can accept input AC signals at either 120 or 240 VAC).

Figure 11:
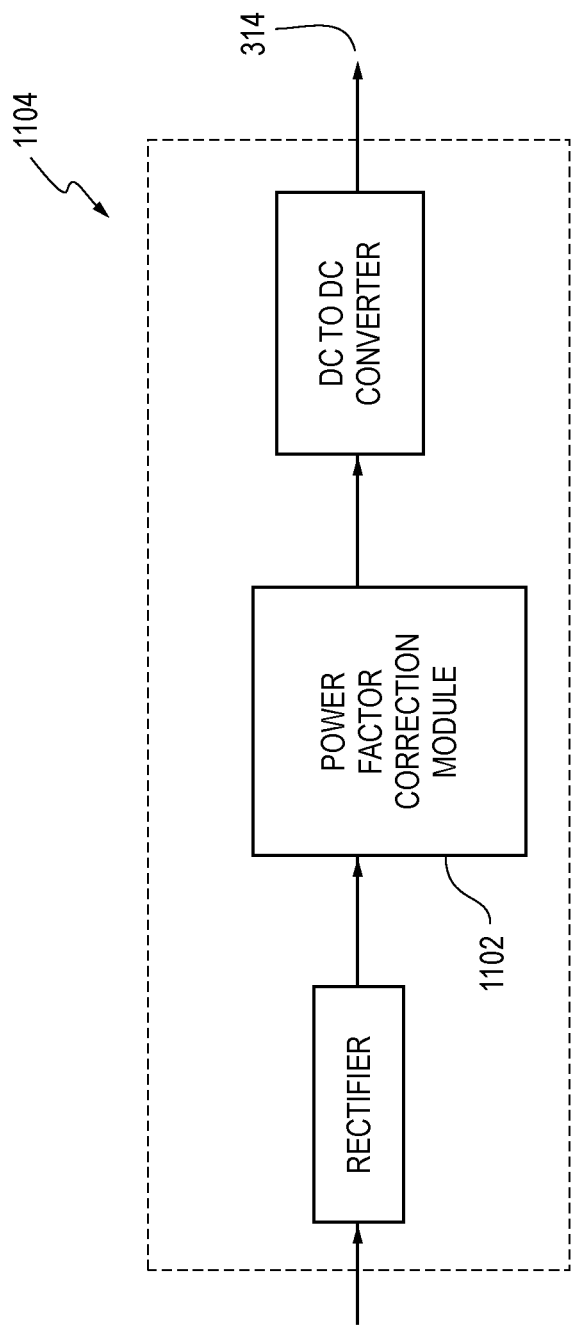

In the embodiments of FIG. 11, in the AC to DC voltage power supply 1104, the rectified DC signal is corrected via a power factor correction module 1102 prior to being input to the DC-to-DC converter. The power factor correction module 1102 corrects the power factor of the input circuitry to improve efficiency and can include circuitry to suppress emission.

Figure 12:
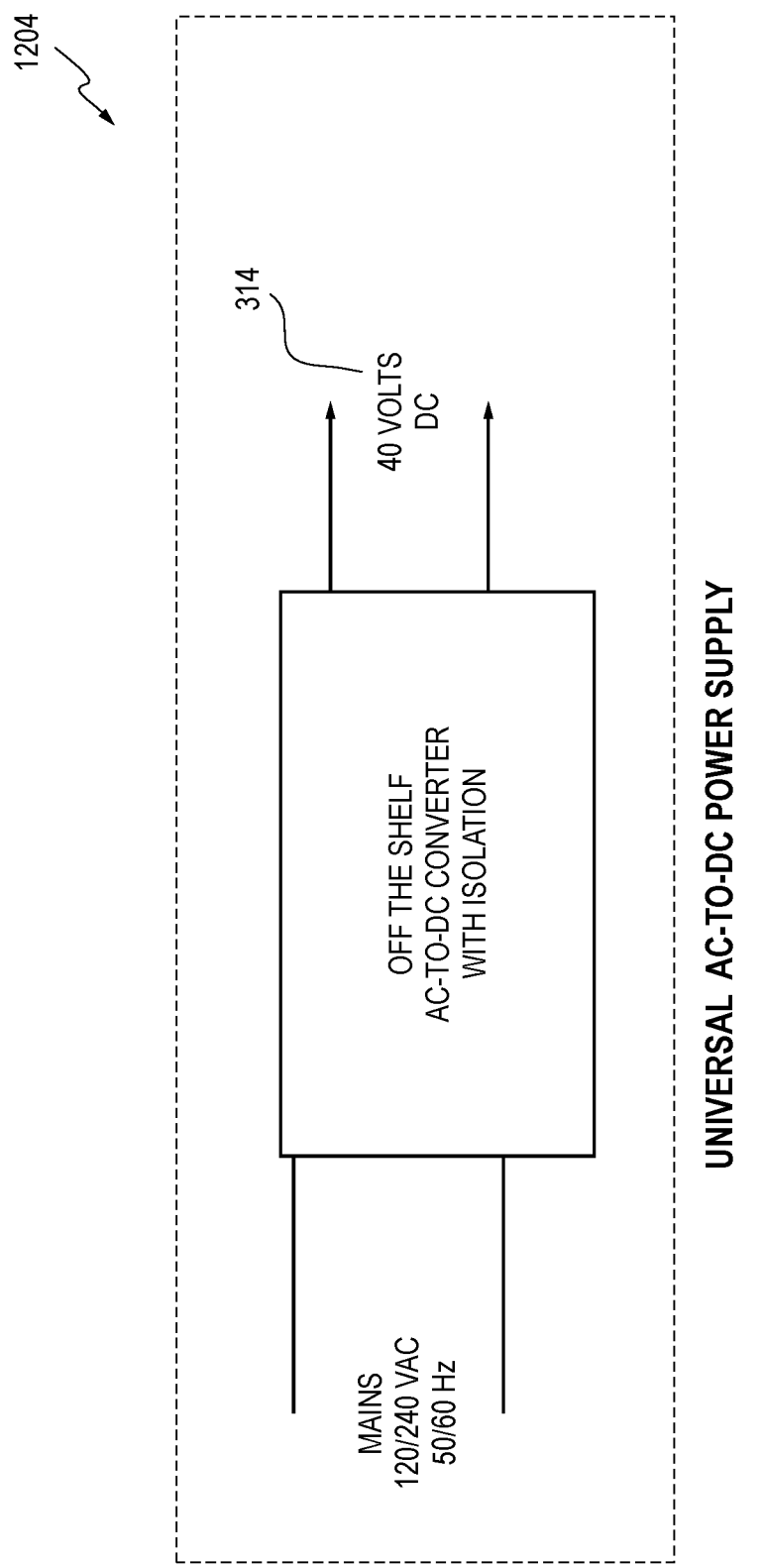

In the embodiments of FIG. 12, the AC to DC voltage power supply 1204 includes an off-the-shelf AC to DC converter with isolation that provides a DC output. In this embodiment, the power supply 1204 can accept input AC signals of a variety of characteristics, such as at both 120 or 240 VAC, and provides a 40 volt DC output.

In all of the embodiments of FIGS. 8-12, the power supply circuits provide a DC voltage 314 that is input to any of the various AC signal generators described herein and any other variations not described herein. For example, the DC voltage 314 may be supplied to the various H-Bridge and/or digital amplifier (Class-D amplifiers) based AC signal generators described with references to FIGS. 3-4, 7 and 13-17. It is understood that the specific values and characteristics for the input AC signal, and components of the various power supplies can be designed and/or selected to provide a DC voltage having the desired level suitable for the given application.

Figure 13:
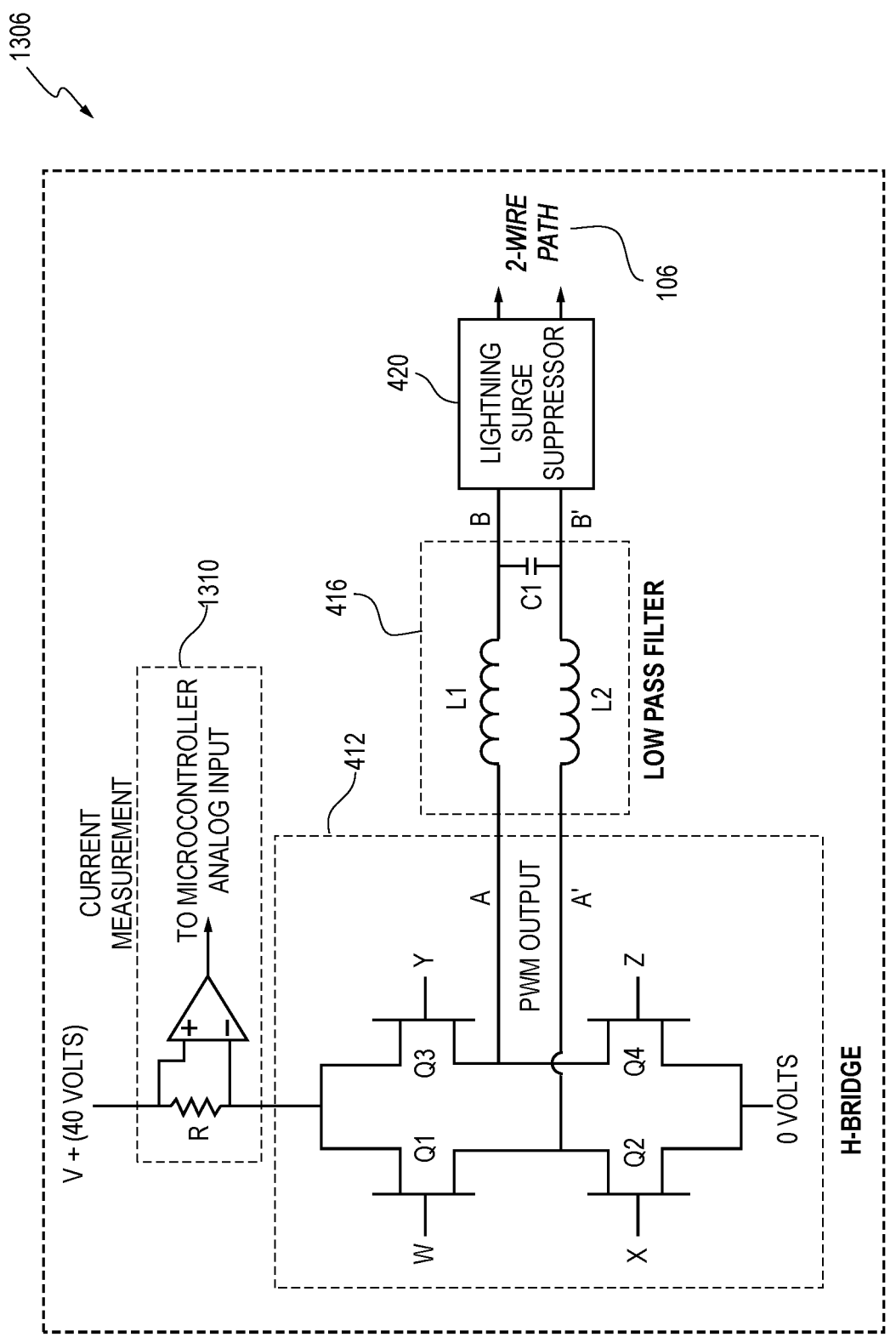
FIGS. 13-17 illustrate simplified block diagrams of exemplary AC signal generators of an encoder including current measurement functionality in accordance with some embodiments.

Referring next to FIGS. 13-17, diagrams are shown of exemplary AC voltage generators of encoders of irrigation control units in accordance with some embodiments. In the embodiments of FIG. 13, the AC voltage generator 1306 includes the current measure circuit 1310, the H-Bridge circuit 412, the filter circuit 416, and the surge suppressor circuit 420. In this embodiment, the DC voltage (e.g., 40 volts) is coupled to the H bridge circuit 412 and the PWM control signal is input to the H-Bridge driver circuit 406 which provides drive signals 408 to each of the components (W, X, Y, Z) of the H-Bridge circuit 412. These drive signals turn on and off the switches (MOSFETs Q1, Q2, Q3, Q4) accordingly to provide the PWM output (e.g., signal 614 of FIG. 6A). The filter circuit 416 (e.g., low pass filter) removes unwanted frequencies and smooth the output waveform to provide the output AC signal (e.g., signal 518 of FIG. 5 or signal 618 of FIG. 6B). In this embodiment, the current measure circuit 1310 is coupled in between the AC to DC voltage power supply (AC to DC converter 304) and the H-Bridge circuit 412. As described above, the current measure circuit 1310 provides a measure of the current of the AC power signal, e.g., to indicate if an addressed decoder (irrigation device) is drawing power. In this arrangement at the DC input to the H-bridge circuit 412, the measurements of the current measure circuit 1310 can also be used to detect ground faults in the H-bridge circuit (i.e., current flowing to ground instead of through the multi-wire path 106).

Figure 14:
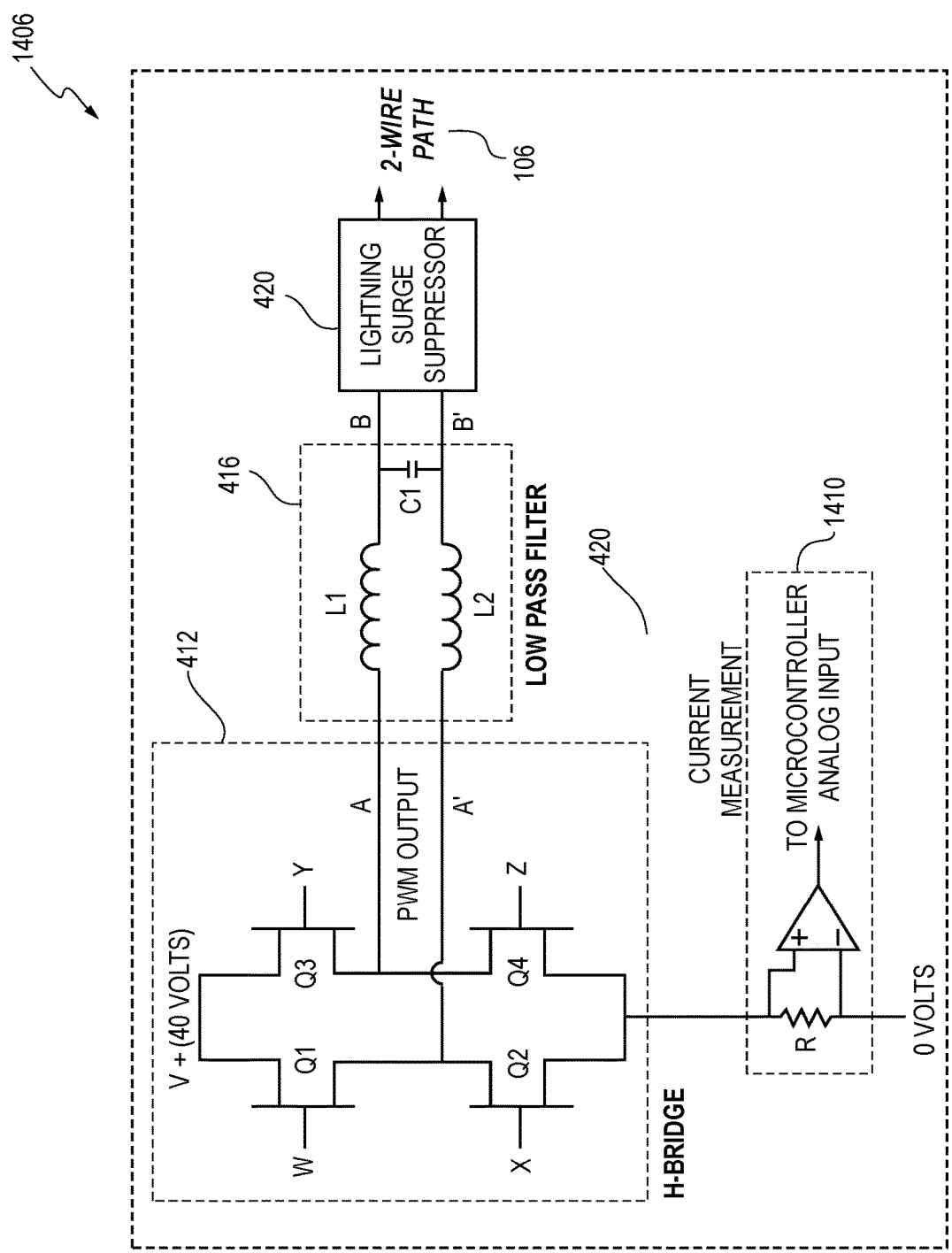

In the embodiments of FIG. 14, the current measure circuit 1410 of the AC voltage generator 1406 is coupled between Q2 and Q4 of the H-Bridge circuit 412 and the zero volt DC or ground reference. In this arrangement, the output of the current measure circuit 1410 provides accurate current measurements due to its proximity to ground, e.g., in some embodiments, the current measurements are more accurate than the embodiment of FIG. 13. However, in some embodiments, the measurements do not indicate the direction of current flow and it cannot detect ground faults.

Figure 15:
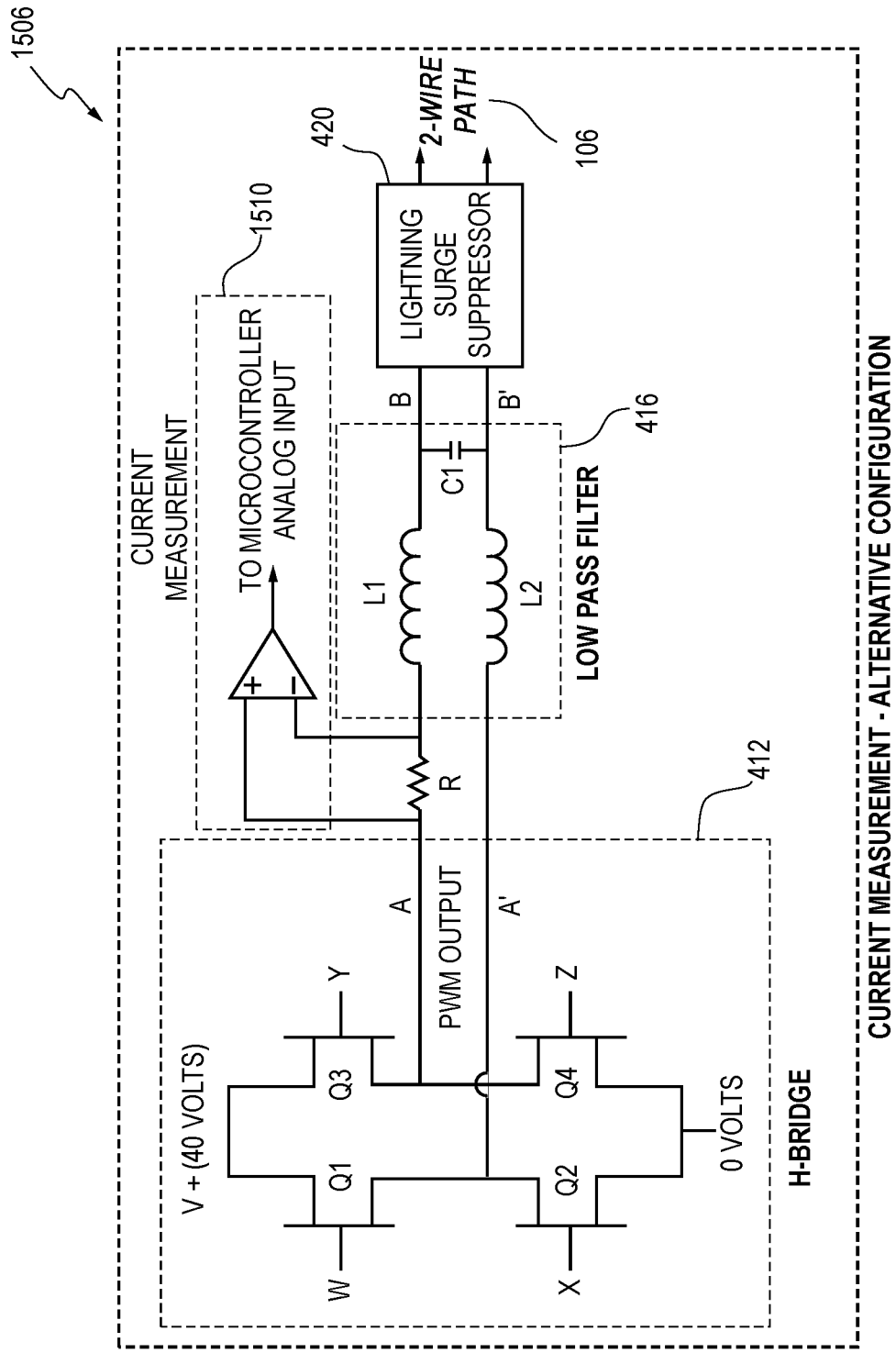

In the embodiments of FIG. 15, the current measure circuit 1510 of the AC signal generator 1506 is coupled across a resistor at the output A of the H-Bridge circuit and inductor L1 of the filter circuit 416, e.g., between the H-Bridge circuit output and the filter circuit 416. In this arrangement, the output of the current measure circuit 1510 provides accurate current measurements that indicate current direction flow over the multi-wire path 106.

Figure 16:
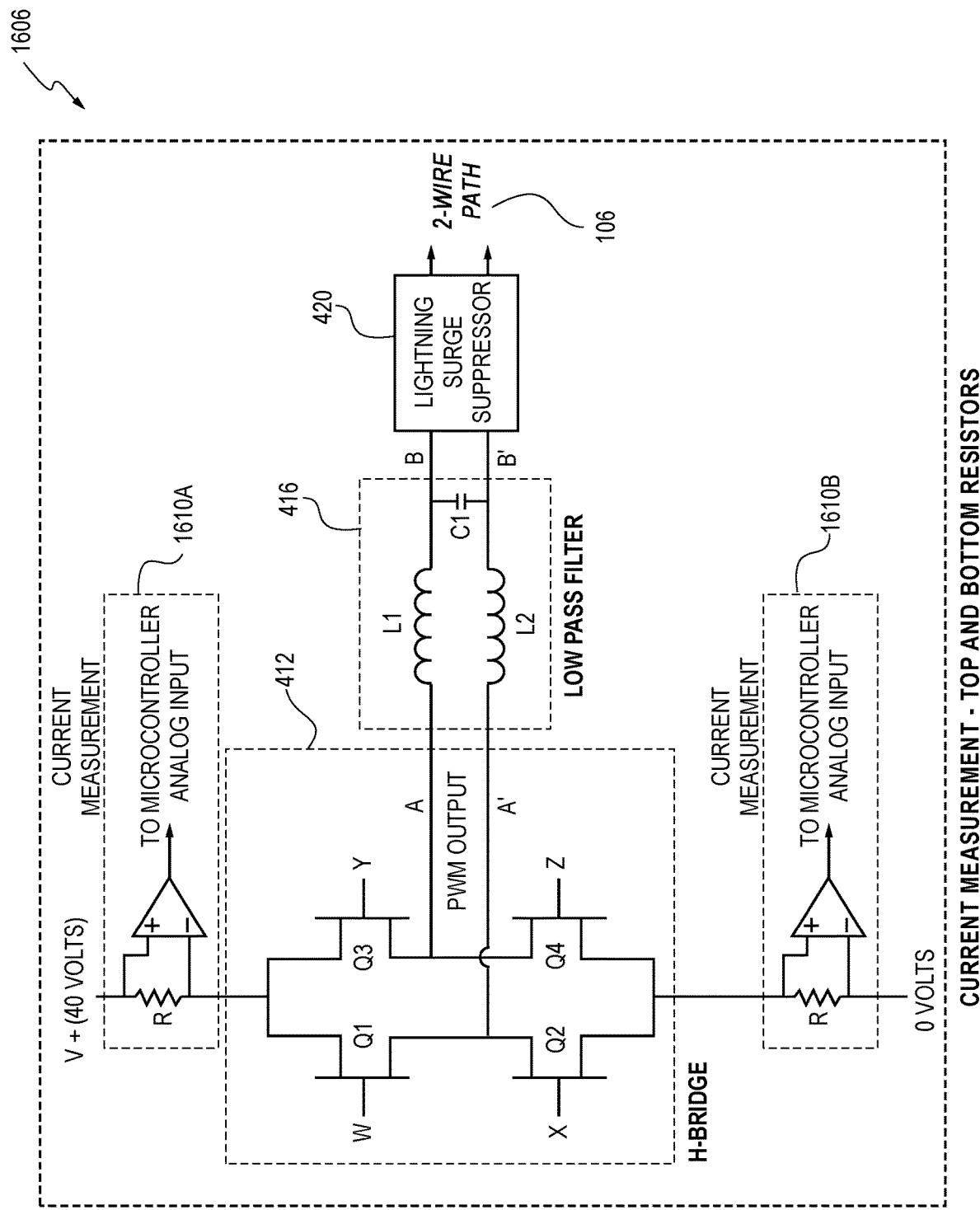

In the embodiments of FIG. 16, a first current measure circuit 1610A of the AC signal generator 1606 is coupled in between the AC to DC converter 304 and the H-Bridge circuit 412 and a second current measure circuit 1610B is coupled in between Q2, Q4 of the H-Bridge circuit 412 and the zero volt DC or ground reference. In this arrangement, both measurements (from the first current measure circuit 1610A and the second current measure circuit 1610B) are used by the microcontroller (control circuit). For example, in addition to sensing current in the multi-wire path, the output of the first current measure circuit 1610A can indicate ground faults, and the output of current measure circuit 1610B provides accurate current measurements due to its proximity to the zero volt DC or ground reference.

Figure 17:
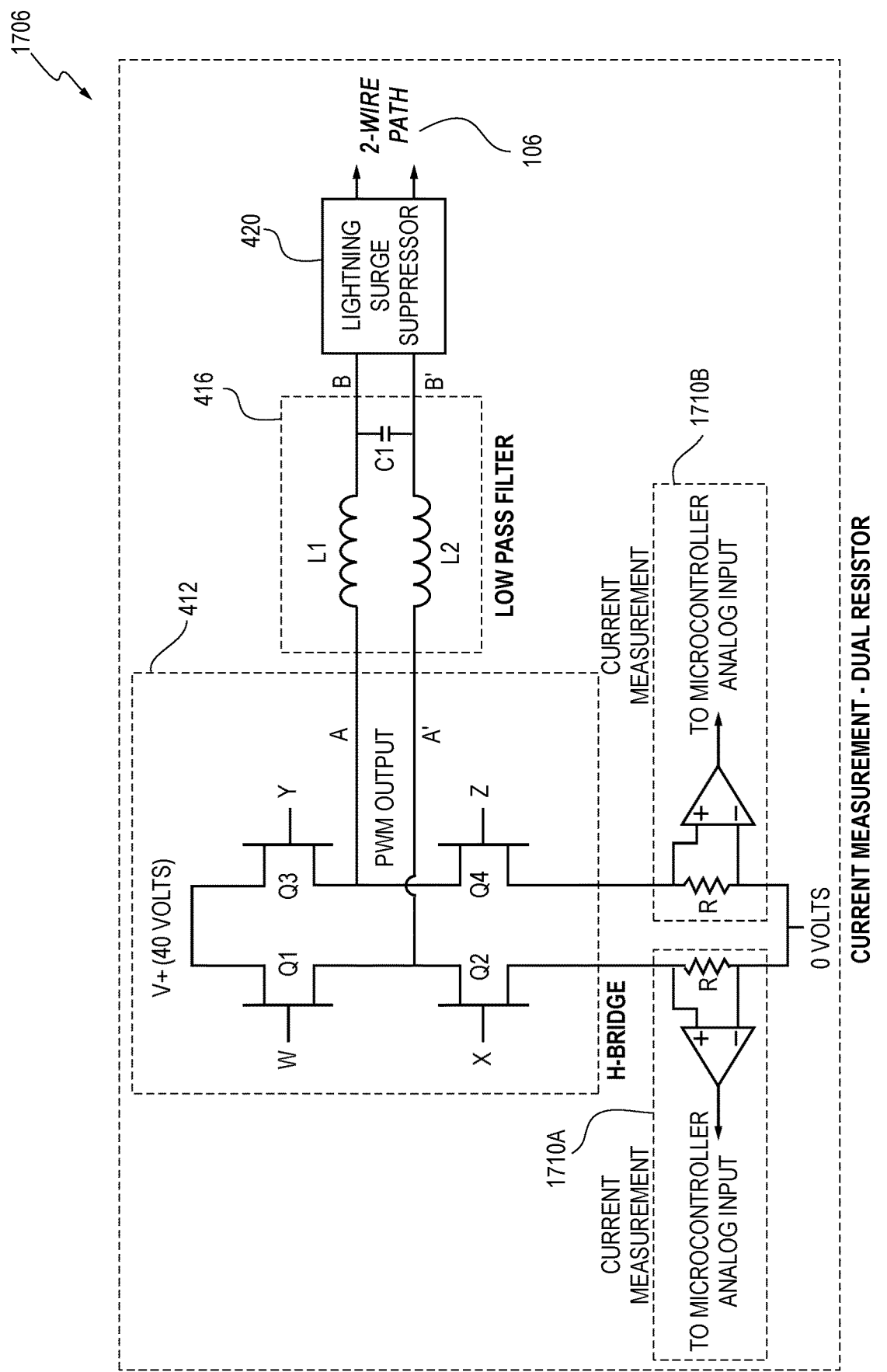

In the embodiments of FIG. 17, a first current measure circuit 1710A of the AC signal generator 1706 is coupled between Q2 and the zero volt DC or ground reference, and a second current measure circuit 1710B is coupled between Q4 and the zero volt DC or ground reference in parallel to the first current measure circuit 1710A. In this arrangement, in some embodiments, using the outputs of both current measure circuits 1710A and 1710B, the microprocessor can also determine the direction of current over the multi-wire path 106.

It is understood that the specific values and characteristics for the components of the H-Bridge circuit 412, the filter circuit 416, the surge suppressor circuit 420 and the various current measure circuits can be designed and/or selected to provide the intended functionality and performance suitable for the given application. In some embodiments, the H-bridge circuit 412 of FIGS. 13-17 could alternatively be implemented using another switching amplifier, such as a Class D amplifier.

Figure 18:
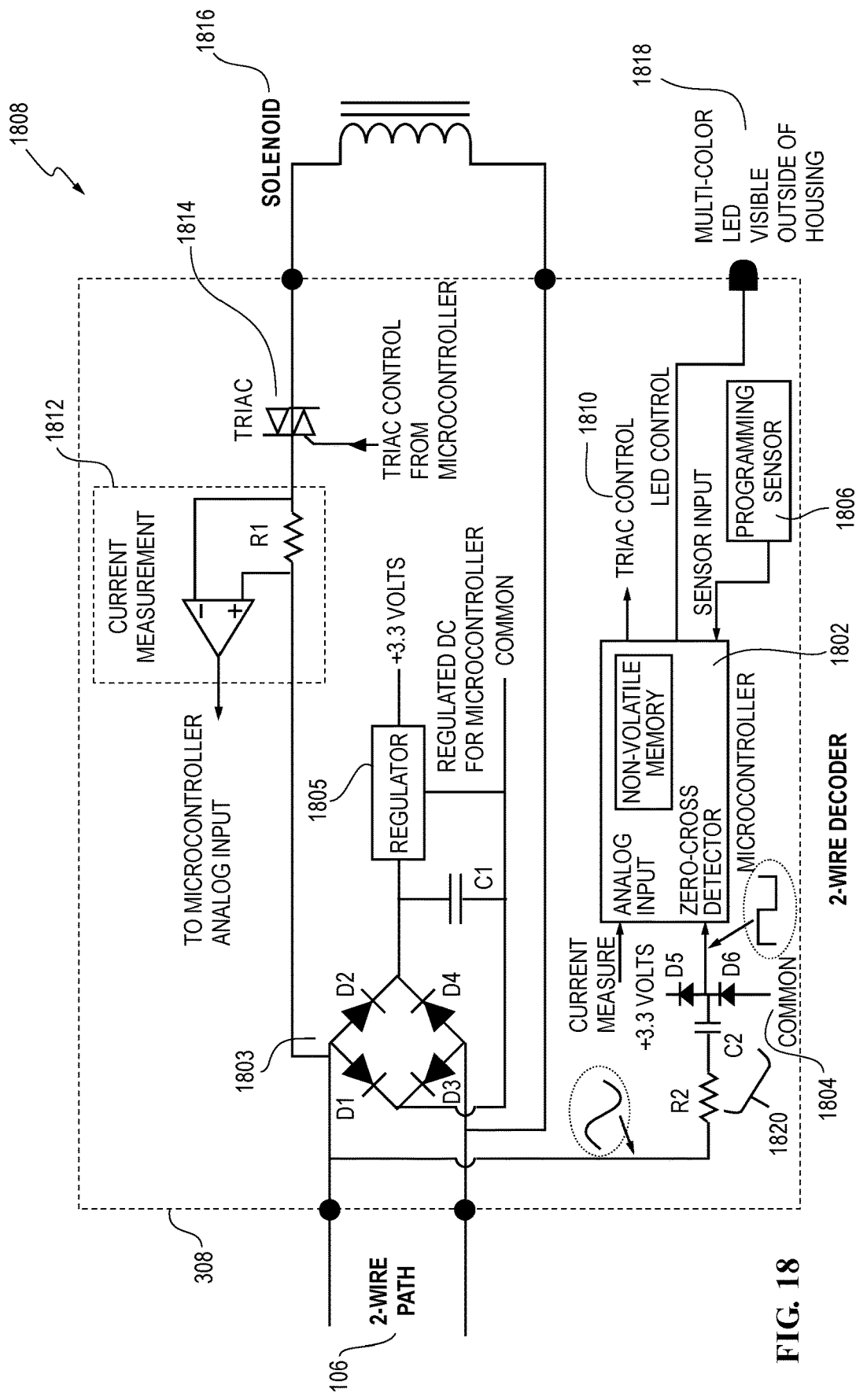
FIG. 18 illustrates a simplified block diagram of an exemplary decoder that would couple to a multi-wire path in accordance with some embodiments.

Referring next to FIG. 18, an exemplary decoder (decoder unit) that would couple to the multi-wire path 106 is shown. In some embodiments, a decoder 1808 includes a current measure circuit 1812, a microcontroller 1802 (which may be generically referred to as a control circuit), a switch 1814 (e.g., a triode for alternating current, TRIAC), a light emitting diode (LED) 1818 (e.g., a multi-color LED or other visual indicator), a programming sensor 1806, and a voltage signal clipper 1804. In some embodiments, an output AC signal having been modulated with data is transmitted on the multi-wire path 106 and received at an input interface of the decoder.

The AC signal 316 is received by the decoder 1808 over the multi-wire path 106 at its input interface (typically, wires coupled to the multi-wire path). In order to derive operational power for the decoder 1808, the AC signal is rectified by rectifier 1803 and regulated by regulator 1805 to provide a DC voltage for the microcontroller 1802 (e.g., 3.3 volts DC). The received AC signal is filtered by one or more RC circuits (R2/C2) 1820 and/or passed through a voltage signal clipper circuit 1804 which provides an input to the microcontroller 1802 (control circuit). In some embodiments, the microcontroller 1802 uses the output of the clipper circuit 1804 to detect the zero crossings of the received AC signal, which provides the microcontroller with the frequency of the received AC signal. In embodiments where one or more periods of the AC signal have been frequency modulated, zero crossing detection (e.g., determining when the signal crosses at zero voltage and the relative timing of zero crossings in the waveform indicates the frequency of a given cycle or cycles of the waveform) allows demodulation of the data encoded on the AC signal. It is understood that other circuitry may be needed to decoder AC signals that are amplitude and/or phase modulated. The demodulated or decoded data will provide addressing data and commands or other actions for the decoder. If the addressing data indicates that the given decoder is not addressed, then the microcontroller can ignore the commands/actions. If the addressing data indicates that the given decoder is being addressed, then the microcontroller processes and executes the received commands/actions. Generally, in some embodiments, the RC circuit 1820, the voltage clipper circuit 1804 and the microcontroller 1802 function together as a decoder circuit that decoder the data modulated on the signal received at the input interface.

In the illustrated embodiment, the decoder 1808 controls an AC solenoid 1816, e.g., that is coupled to an irrigation valve. The received AC signal provides power and is also coupled to the switch 1814 and the solenoid 1816. In the event the received decoded data indicates that the decoder is to activate the solenoid 1816, the microcontroller 1802 closes the switch 1814 drawing current and power to the solenoid 1816. This causes a solenoid activated valve to actuate to an open position allowing water to flow to sprinkler devices.

In some embodiments, the current measure circuit 1812 coupled to the switch 1814 senses and provides output signals to the microcontroller 1802 that are indicative of the current passing or flowing through the switch 1814 and being drawn by the solenoid 1816. The current measure circuit 1812 provides an output signal coupled to the microcontroller 1802 that comprises a measure of the current. In some embodiments, these output signals can be used by the microcontroller to automatically determine if there is a ground short in the solenoid 1816 or whether the solenoid is operating properly. For example, in some embodiments, a typical 24 VAC irrigation solenoid may draw current approximately 250-300 mA of current in normal used when the switch is closed, i.e., approximately 250-300 mA of current pass through the switch. In some embodiments, when the current measure circuit 1812 provides an output signal to the microcontroller 1802 that corresponds to the measure of the current being greater than a threshold of 400 mA, the microcontroller (control circuit) 1802 determines that there is a ground short in the solenoid 1816. In some embodiments, when the current measure circuit 1812 provides an output signal to the microcontroller 1802 that corresponds to the measure of the current being less than another threshold of 150 mA, the microcontroller 1802 determines that there is an open circuit in the solenoid 1816. In some embodiments, a solenoid 1816 may have an inrush current (e.g., the maximal instantaneous input current drawn by the solenoid 1816 when first turned on) that can last for 30-60 milliseconds (e.g., inrush current period). In such an embodiment, the microcontroller 1802 may ignore and/or may not obtain the measure of current from the current measure circuit 1812 fora period between 30-60 milliseconds after the solenoid 1816 is first turned on (after the switch is first closed). In some embodiments, the microcontroller 1802 may start obtaining and/or receiving the measure of current immediately after the inrush current period to prevent damage to the switch 1814 in the event of a short condition, but not so soon that the microcontroller 1802 falsely identifies the inrush current as a short. For example, the current measure circuit 1812 may measure a current of the output AC signal 316 after a predetermined time delay (e.g., a period anywhere between 30-60 milliseconds) following closing of the switch 1814 to account for an initial inrush current. In some embodiments, a control circuit (e.g., a microcontroller 1802) may determine that a ground short condition exists when the measure of the current is greater than a first threshold which set at a level above the peak normal current draw following the inrush period (e.g., the threshold is set to 400 mA when the peak normal current draw is about 300 mA). In some embodiments, a control circuit (e.g., a microcontroller 1802) may determine that an open circuit condition exists when the measure of the current is less than a second threshold. In some embodiments, the second threshold is less than the first threshold, and is usually set at a level below the lowest normal current draw following the inrush period (e.g., the threshold is set to 150 mA when the peak normal current draw is about 250 mA).

In some embodiments, the LED 1818 (or other visible or visual indicator) is fixed to the decoder housing to be viewable to a user and is electrically coupled to the microcontroller 1802 and can be used to visually indicate status of the decoder to the user. For example, in some embodiments, the LED 1818 may be illuminated in the event the microcontroller 1802 detects a short in the solenoid 1816 using the current measure circuit 1812. The LED 1818 may also indicate whether the solenoid is being actuated, indicate that the decoder is being placed into programming mode (see below) or indicate other status or failure modes. In embodiments using multiple colors, the colors can have different indications. Further in some embodiments, the LED may be evenly or intermittently illuminated (e.g., flashed or blinked) to show status.

In some embodiments, the decoder 1808 includes a programming sensor 1806 that provides an output to the microcontroller 1802. In some embodiments, the programming sensor comprises a magnetic sensor, such as a Reed switch, Hall effect sensor or other magnetically activated sensors. For example, in some embodiments, a magnet (e.g., included in a wand, pencil, or other structure) is brought into proximity to the programming sensor 1806 which causes the sensor 1806 to output a signal to the microcontroller 1802. This causes the microcontroller 1802 to enter a programming mode such that it will be receptive to and store programming commands demodulated from received AC signals. Such programming commands may provide the decoder with station assignments, assigned addressing data, scheduling data, and operation data, for example. In some embodiments, these programming commands originate from the irrigation controller functionality of the irrigation control unit of the irrigation control system.

The microcontroller 1802 is an example of a control circuit such as described herein. For example, a control circuit is a processor-based device including one or more processors, and operates with one or more integrated or connected memories. The control circuit 305 and the memory may be integrated together, such as in a microcontroller, application specification integrated circuit, field programmable gate array or other such device, or may be separate devices coupled together. Generally, the control circuit 305 can comprise a fixed-purpose hard-wired platform or can comprise a partially or wholly programmable platform. These architectural options are well known and understood in the art and require no further description here. And generally, the control circuit 305 is configured (for example, by using corresponding software and/or firmware programming as will be well understood by those skilled in the art) to carry out one or more of the steps, actions, and/or functions described herein.

Figure 26:
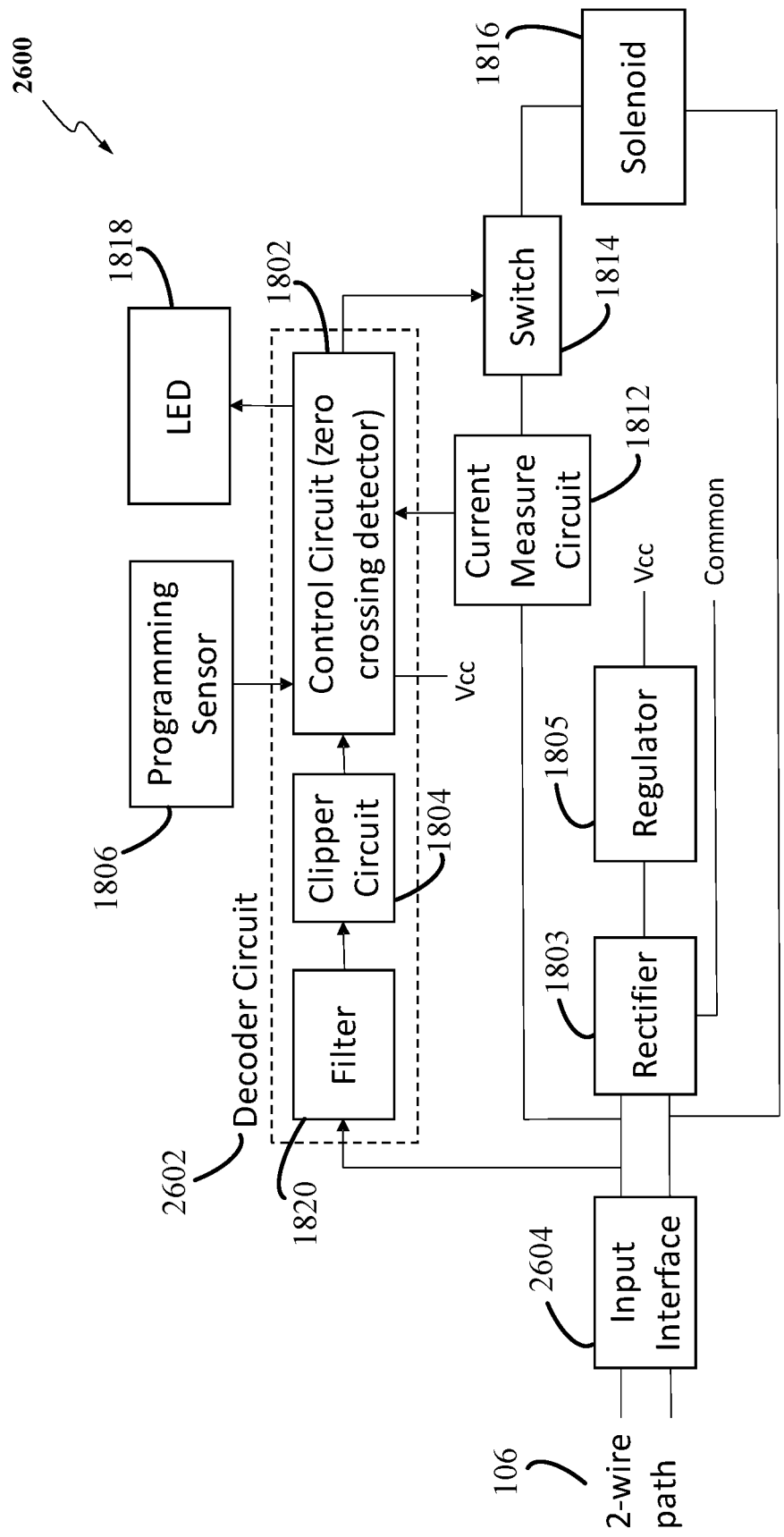
FIG. 26 illustrates a simplified block diagram of an exemplary decoder unit for an irrigation system that receives power and data from an irrigation control unit in accordance with some embodiments.

Referring next to FIG. 26, a simplified block diagram of an exemplary decoder unit 2600 for an irrigation system that receives power and data from an irrigation control unit in accordance with some embodiments is shown. In some embodiments, the decoder unit 2600 is a more generic version of the decoder unit 1808 of FIG. 18. In some embodiments, the irrigation control unit may correspond to the system 100 of FIG. 1, the system 200 of FIG. 2, and/or the system 300 of FIG. 3. In some embodiments, one or more elements of the decoder unit 2600 described herein may correspond to one or more elements described in the decoder 1808 of FIG. 18. In some embodiments, the decoder unit 2600 includes an input interface 2604 that couples to a multi-wire path 106 of a decoder-based irrigation control system and receives an output AC signal modulated with data and transmitted by an encoder of an irrigation control unit over the multi-wire path 106. In some embodiments, the input interface 2604 may include a terminal block, a coaxial connector, a pluggable connector, and a circular connector, among other types of commercially available connectors. In some embodiments, the input interface 2604 comprises wires extending from the circuitry of the decoder 2600 that are spliced or coupled to the multi-wire path 106. In some embodiments, the output AC signal is modulated with data using one or more of amplitude, phase and frequency modulation, or any other known modulation techniques. In some embodiments, the modulation of the output AC signal includes selective modulation of a frequency of one or more cycles of the output AC signal to have a selectable one of a plurality of frequencies (such as described herein, see example modulations in FIGS. 19-23). In some embodiments, the decoder unit 2600 includes a switch 1814 coupled to the input interface 2604. In some embodiments, the switch 1814 may include a triode for alternating current (TRIAC) and/or other switching devices commercially available that is controllable by a control circuit, a processor, and/or a microcontroller. In some embodiments, the switch 1814 couples to a solenoid 1816 of an irrigation device (e.g., a valve). In some embodiments, the decoder unit 2600 includes a decoder circuit 2602 connected and/or coupled to the input interface 2604 and including a control circuit 1802. In some embodiments, the control circuit 1802 decodes the data from the received output AC signal input to the decoder circuit 2602. It is understood that the circuitry and function of the decoder circuit can vary depending on the modulation of the output AC signal. In some embodiments, the control circuit 1802 determines, from the decoded data, that the irrigation device is to be activated. In some embodiments, the control circuit 1802 outputs a control signal to the switch 1814 to cause the switch 1814 to close and connect the output AC signal to the solenoid 1816.

In some embodiments, the decoder unit 2600 includes a current measure circuit 1812 coupled to the switch 1814. In some embodiments, the current measure circuit 1812 may include an operational amplifier and a resistor. In some embodiments, the current measure circuit 1812 measures a current of the output AC signal passing through the switch 1814 and being drawn by the solenoid 1816 and provides a first output signal including the measure of the current to the control circuit 1802. In some embodiments, the control circuit 1802 determines, based on the measure of the current, whether the solenoid 1816 is operating properly or whether a ground short condition exists. In some embodiments, the decoder unit 2600 includes a light emitting diode (LED) 1818 (e.g., a multi-color LED), a programming sensor 1806, and/or a voltage signal clipper 1804. In some embodiments, the LED 1818 may be mounted on a housing enclosing the decoder circuit 2602, the switch 1814, and/or the current measure circuit 1812. In some embodiments, the LED 1818 illuminates when the control circuit 1802 determines the ground short condition exists.

In some embodiments, a decoder circuit 2602 may be coupled to the input interface 2604. In some embodiments, the decoder circuit 2602 includes a filter 1820 coupled to the input interface 2604. In some embodiments, the filter 1820 filters the output AC signal. In some embodiments, the decoder circuit 2602 includes a clipper circuit 1804 coupled to an output of the filter 1820. In some embodiments, the clipper circuit 1804 limits an amplitude of the filtered output AC signal. In some embodiments, the clipper circuit 1804 may include two diodes in series and/or one or more electronic components capable of clipping or attenuating portions of a signal waveform, for example, the output AC signal. In some embodiments, the clipper circuit 1804 may include two Zener diodes in series. In some embodiments, the decoder circuit 2602 includes a control circuit 1802 that receives a filtered and clipped output AC signal from the clipper circuit 1804. In some embodiments, the control circuit 1802 is configured to (programmed to) detect zero crossings and timing of the zero crossings of the filtered and clipped output AC signal. In some embodiments, the control circuit 1802 determines a frequency of one or more cycles of the output AC signal. For example, the control circuit 1802 can determine or distinguish the frequency of each cycle or group of cycles in the received waveform to decode data in the waveform. In some embodiments, the control circuit 1802 decodes the data modulated on the output AC signal based the frequency of multiple sets of the one or more cycles of the output AC signal. In some embodiments, the control circuit 1802 determines, from the decoded data, that the irrigation device is to be activated. In some embodiments, the control circuit 1802 outputs a control signal to the switch 1814 to cause the switch 1814 to close and connect the output AC signal to the solenoid 1816.

Referring next to FIGS. 19-23, several illustrations are provided of exemplary output AC signals modulated with data by an encoder for transmission on the multi-wire path in accordance with some embodiments.

Figure 19:
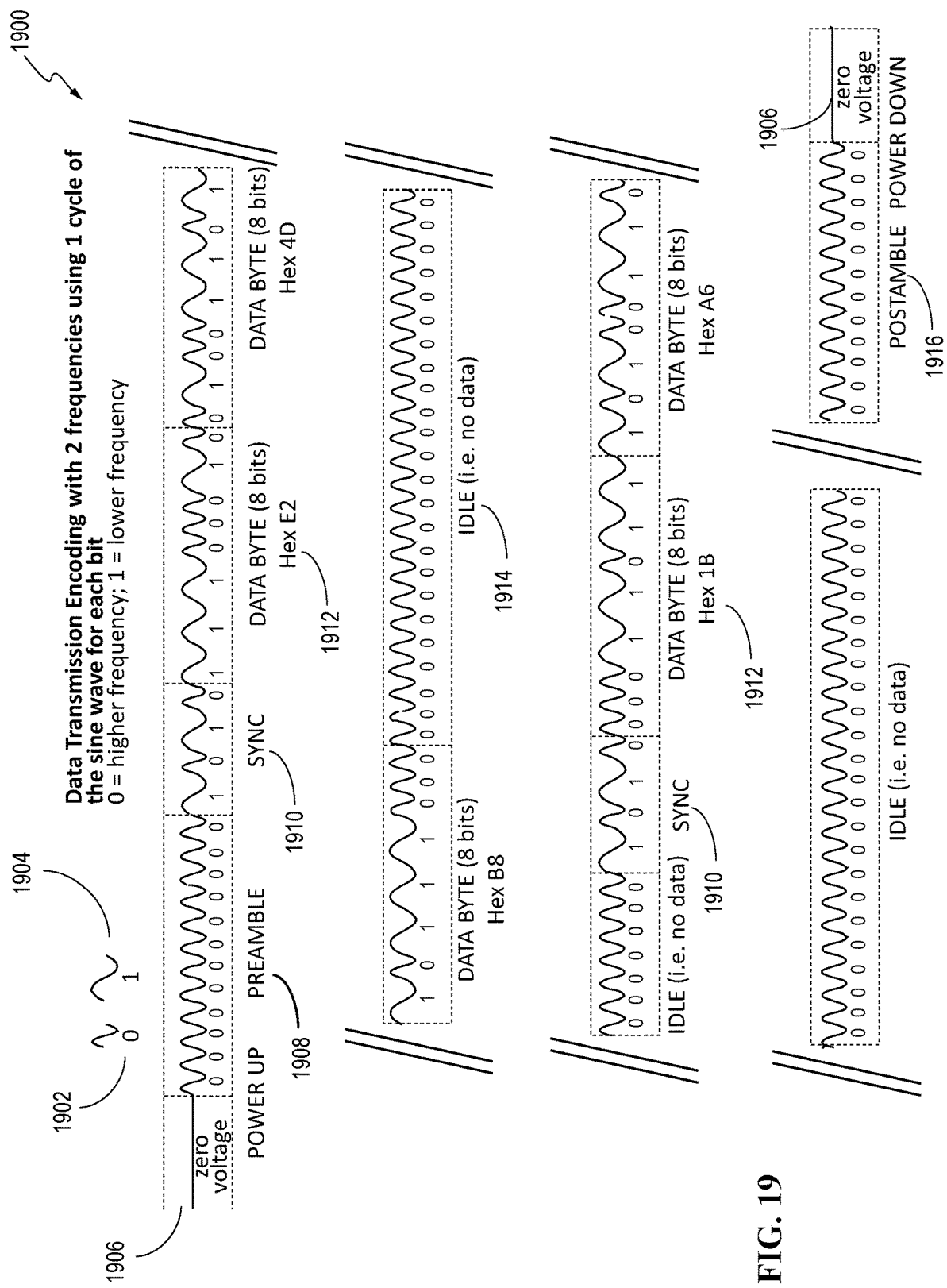
FIG. 19 is a schematic illustration of an exemplary output AC signal modulated with data by encoding each cycle of the AC signal with one of two frequencies to represent a data bit in accordance with some embodiments.

In the embodiments of FIG. 19, the AC signal 1900 is modulated with data by encoding each cycle of the AC signal with one of two frequencies to represent data bits. In FIG. 19, each cycle of the AC signal is modulated to be either at a first frequency (see first cycle 1902) or at a second frequency (see second cycle 1904). As illustrated, the first cycle 1902 is at a higher frequency (the first frequency) than the second cycle 1904 (the second frequency). As can be seen, in these embodiments, the first cycle 1902 represents a logic 0 and the second cycle 1904 represents a logic 1. The signal protocol includes a preamble 1908, a sync portion 1910, a data portion 1912, an idle portion 1914, and a postamble 1916. In some embodiments, the decoder may not be powered on as shown in 1906 where zero voltage is applied to the path. During the start of power/data transmission, the preamble 1908 is sent as a number of the first cycles to provide the decoder and/or the irrigation devices time to power up and/or activate before it is time to decode data. Next, a sync portion 1910 having a known sequence of modulated cycles is provided to indicate the start of data transmission. For example, in some embodiments, during a first period of time, one or more cycles of the waveform are modulated at one or more first frequencies to synchronize a start of the modulated data portion of the waveform. Next, the data portion 1912 is provided that includes a series of cycles modulated as either cycle 1902 or 1904 to transmit data bits (and data bytes) to the decoder. For example, in some embodiments, during a second period, the output AC signal is modulated such that one or more cycles of the output AC signal are at one or more second frequencies to create the modulated data portion. In some embodiments, the second frequencies can be the same as the first frequencies, can have one or more frequencies in common or can be different frequencies. In some embodiments, the encoded data in the modulated data portion can represent one or more of a first instruction to activate one or more irrigation devices and a second instruction to deactivate the one or more irrigation devices. There may also be periods of no data transmission shown by the idle portion 1914, which is the same as the preamble 1908. For example, in some embodiments, there may be one or more periods within the modulated data portion where the output AC signal is modulated such that one or more cycles of the output AC signal are at one or more first frequencies to separate data content of the modulated data portion. If data transmission is to resume, another sync portion 1910 and data portion 1912 are provided. If no further data transmission is needed, the idle portion continues followed by the postamble 1916, and then the signal is no longer applied to the multi-wire path. For example, in some embodiments, the output AC signal is modulated such that one or more cycles of the output AC signal are at the one or more first frequencies to synchronize an end of the modulated data portion of the output AC signal. Given that each cycle of the AC signal is modulated to one of two frequencies, the decoding circuitry need only detect the timing of zero crossings to determine the frequency of a given cycle, and thus, the data bit represented by the cycle. In some embodiments, one or more frequencies are used for modulating data in the date portion (e.g., the one or more second frequencies) and at least one different frequency is used in the portions of the waveform that serve to frame (sync and/or end) or separate the data portion.

Figure 20:
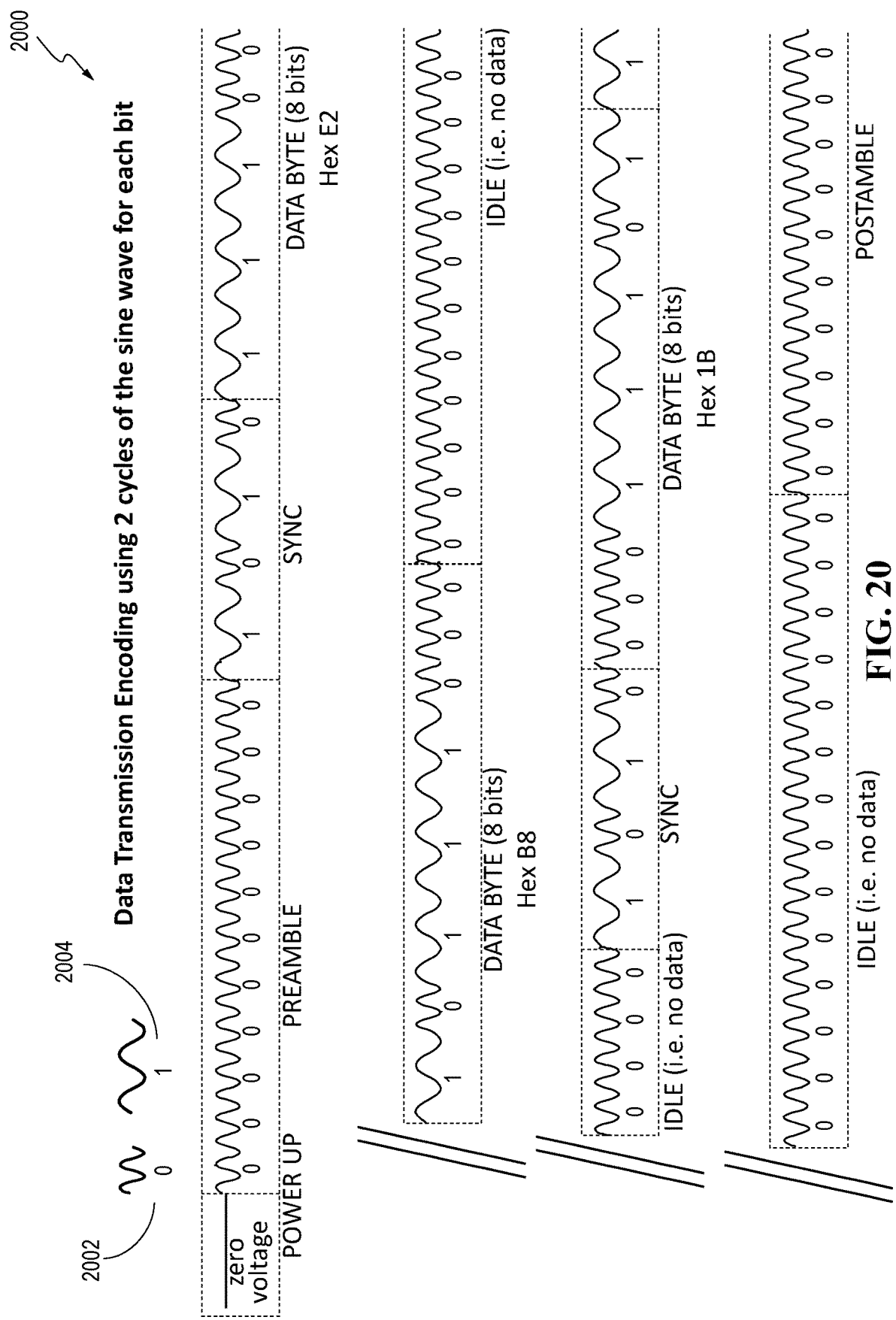
FIG. 20 is a schematic illustration of an exemplary output AC signal modulated with data by encoding two cycles of the AC signal with one of two frequencies to represent a data bit in accordance with some embodiments.

In the embodiments of FIG. 20, an output AC signal 2000 modulated with data is shown in which two cycles of the AC signal are encoded with one of two frequencies to represent data bits. In FIG. 20, two successive cycles of the AC signal are modulated to be either at a first frequency (see first cycle pair 2002) or at a second frequency (see second cycle pair 2004). As illustrated, the first cycle pair 2002 is at a higher frequency (the first frequency) than the second cycle pair 2004 (the second frequency). As can be seen, in these embodiments, the first cycle pair 2002 represents a logic 0 and the second cycle pair 2004 represents a logic 1. Similar to that shown in FIG. 19, the signal protocol includes a preamble, a sync portion, a data portion, an idle portion, and a postamble.

Figure 21:
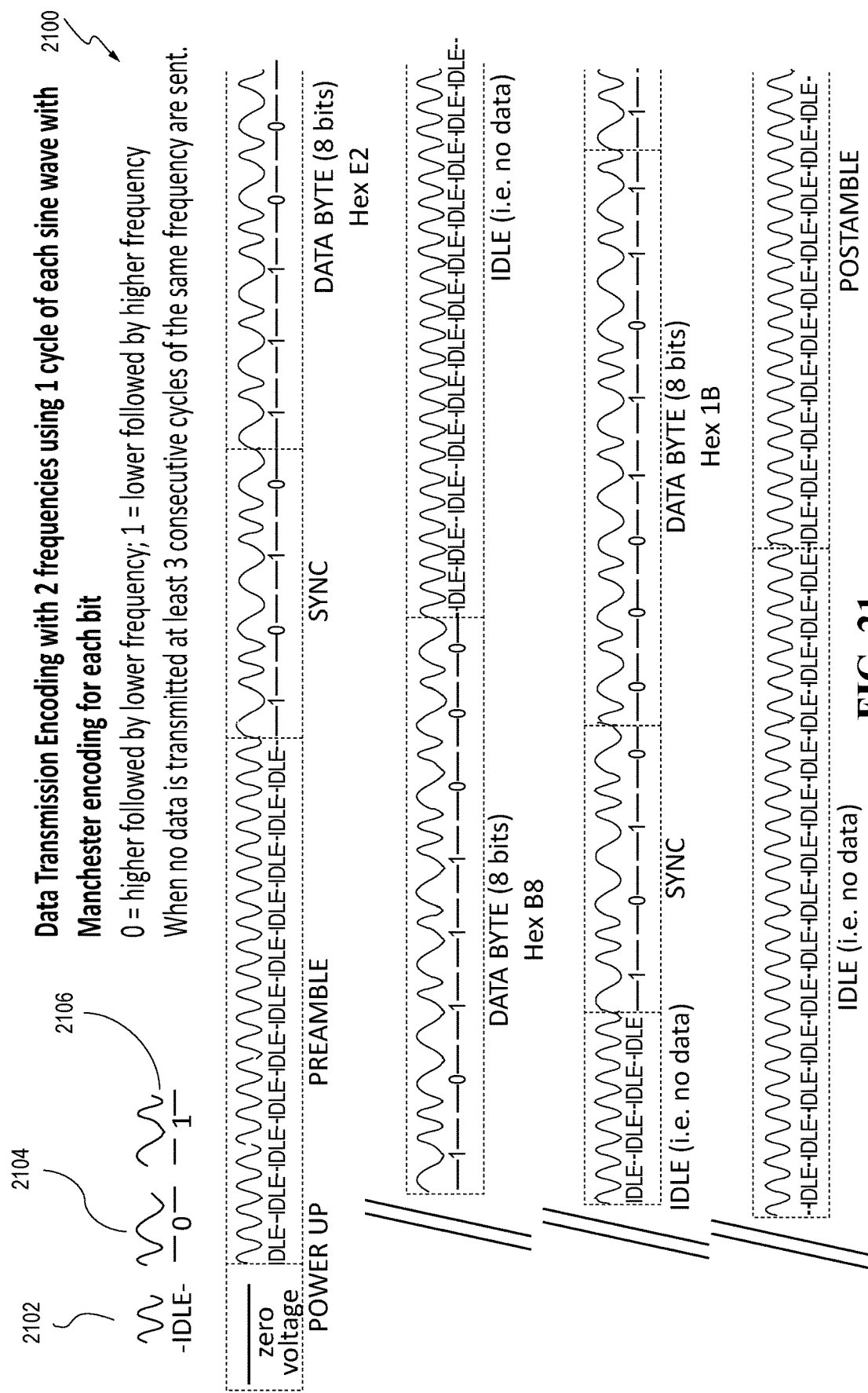
FIG. 21 is a schematic illustration of an exemplary output AC signal modulated using Manchester encoding to represent data bits where each cycle of the AC signal can be one of two frequencies in accordance with some embodiments.

In the embodiments of FIG. 21, an exemplary output AC signal 2100 modulated using Manchester encoding to represent data bits where each cycle of the AC signal can be one of two frequencies is shown. In FIG. 21, two successive cycles of the AC signal are modulated to be at a first frequency (see first cycle pair 2102) to make an idle. For the data, using Manchester encoding, a logic 0 is represented by cycle pair 2104 in which the first cycle is at the first frequency and the second cycle is at the second frequency. And, a logic 1 is represented by cycle pair 2106 in which first cycle is at the second frequency and the second cycle is at the first frequency. In some embodiments, the detection and/or the determination of whether a detected bit is a one or a zero is more robust, and Manchester encoding is not applied in an idle signal 2102 to make it more distinguishable from the data. Similar to that shown in FIG. 19, the signal protocol includes a preamble, a sync portion, a data portion, an idle portion, and a postamble.

Figure 22:
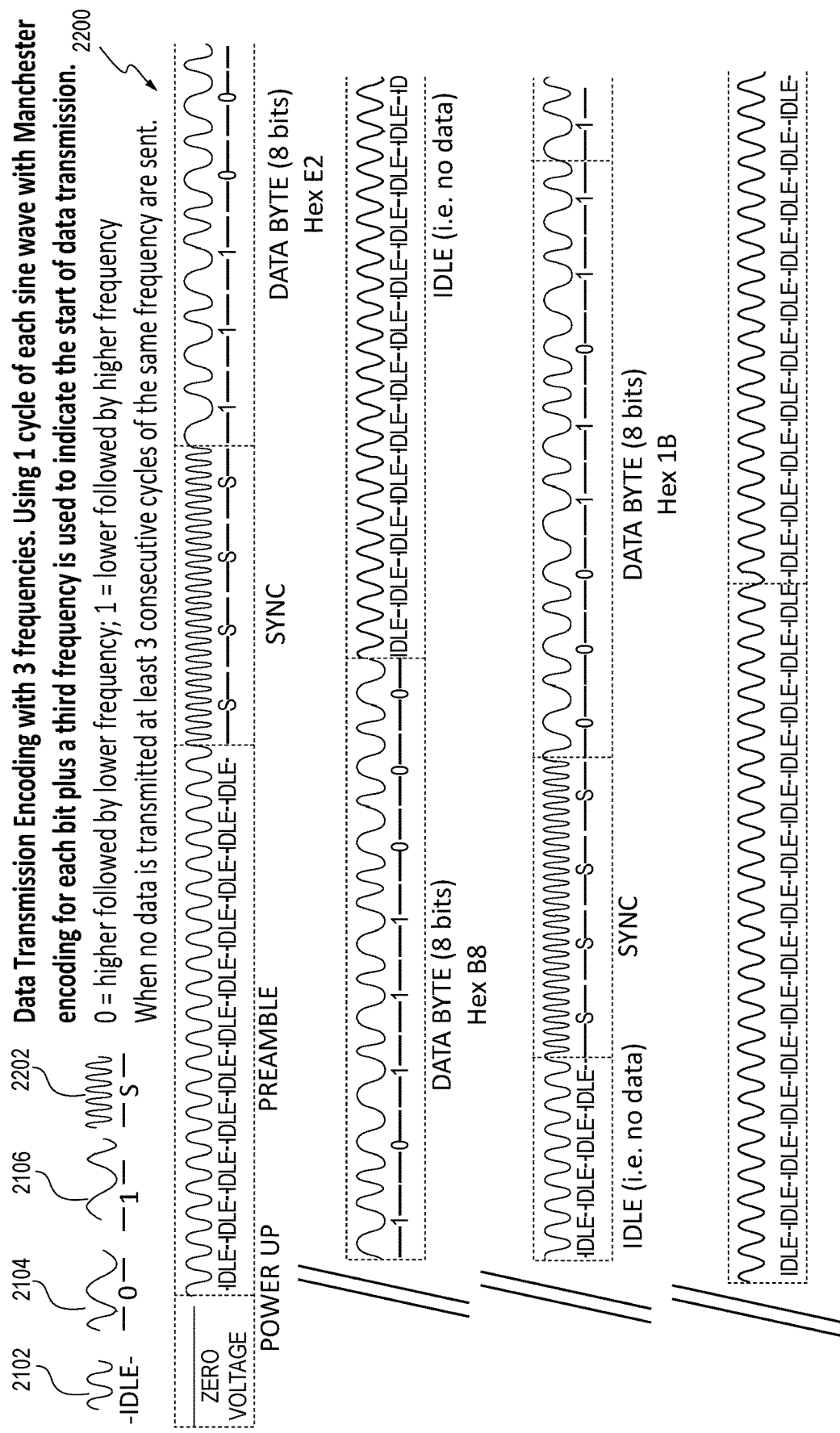
FIG. 22 is a schematic illustration of an exemplary output AC signal modulated using Manchester encoding to represent data bit where each cycle of the AC signal can be one of three frequencies in accordance with some embodiments.

In the embodiments of FIG. 22, an exemplary output AC signal 2200 modulated using Manchester encoding to represent data bit where each cycle of the AC signal can be one of three frequencies is shown. This embodiment is similar to the embodiment of FIG. 21 in that there is the first cycle pair 2102 to make an idle, and there is the first cycle pair 2104 and the second cycle pair 2016. In this embodiment, a set of cycles 2202 is modulated at a third frequency to be used in the sync portion of the signal. In this embodiment, Manchester encoding is not applied in an idle or the sync.

Figure 23:
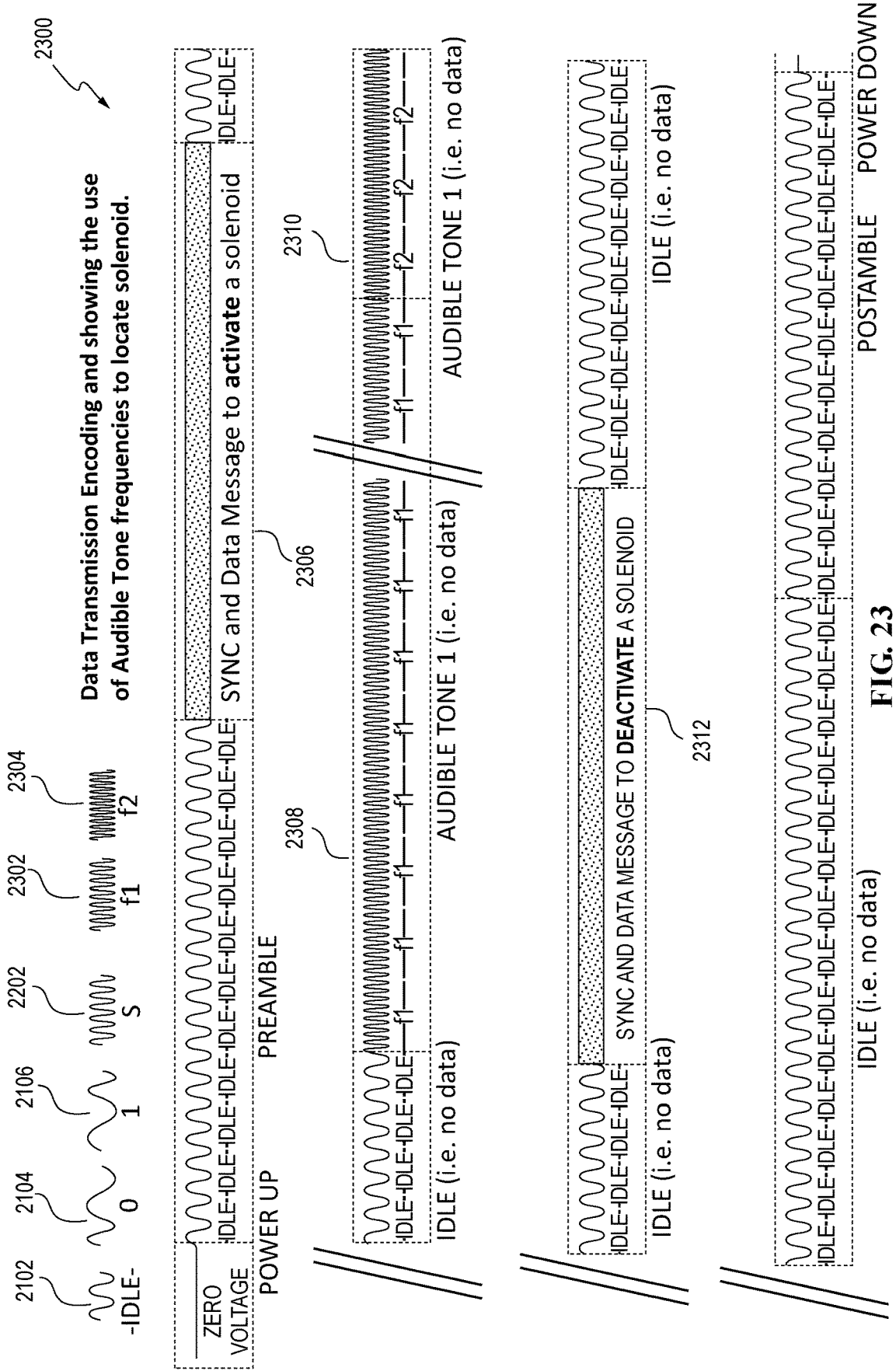
FIG. 23 is a schematic illustration of an exemplary output AC signal modulated with data by encoding each cycle of the AC signal within one of three frequencies and modulating other cycles of the AC signal at additional frequencies to provide audible tones in accordance with some embodiments.

In the embodiments of FIG. 23, an exemplary output AC signal 2300 modulated with data by encoding each cycle of the AC signal with one of three frequencies and modulating other cycles of the AC signal at additional frequencies to provide audible tones is shown. These embodiments are similar to FIGS. 21 and 23, but additionally includes a first set of cycles 2302 modulated at a fourth frequency, and a second set of cycles 2304 modulated at a fifth frequency. The fourth and fifth frequencies are selected to provide an audible sound or tone when applied to the solenoid, e.g., to assist in the location of a given solenoid in the field. In these embodiments, the transmitted data includes a first portion 2306 that includes a data message to activate the solenoid, followed by an idle portion, then followed by a tone portion 2308, then a second tone portion 2310, then followed by a second portion 2312 that includes a data message to deactivate the solenoid. In an illustrative non-limiting example, the result will be a two tone audible sound created by the solenoid to assist the user locating the solenoid. In some embodiments, the fourth and fifth frequencies may include frequencies between an example 60-100 Hz range. In some embodiments, to produce an audible sound, at least two frequencies (e.g., each frequency in the range of between 60-100 Hz) may alternate at a given period, e.g., every hundred milliseconds. For example, the AC signal generator 306 may generate, using a modulation control signal, the output AC signal 316 such that a modulated data portion of the output AC signal 316 may include encoded signaling by alternating group of cycles of the output AC signal 316 between two or more frequencies (e.g., each frequency being in the 60-100 Hz range) to produce a sound audible to a user to assist the user in locating an irrigation device of the irrigation devices in the landscape. For example, the modulated data portion may include a group of cycles modulated at 60 Hz, followed by a group of cycles modulated at 100 Hz, followed by another group of cycles modulated at 60 Hz, and so on, with the frequency changed every time period (e.g., every 100 milliseconds). It is understood that other frequencies and time periods may be used. In some embodiments, the alternation of frequencies in short intervals can produce an audible clicking sound.

In some embodiments, the frequencies selected when using frequency modulation are variations of the input AC signal. For example, if the input AC signal is 120 volts at 60 Hz, the first and second frequencies (for cycles 1902 and 1904, for example) may be 55 and 65 Hz. In another example, if the input AC signal is 120 volts at 60 Hz, the first and second frequencies (for cycles 1902 and 1904, for example) may be 60 and 70 Hz. In some embodiments, these values are selected in order to provide an AC power signal having a voltage and frequency sufficient to power the solenoids coupled to the decoders. In some embodiments, the first and second frequencies may be within plus or minus 50% of the frequency of the input frequency. In other embodiments, the first and second frequencies may be within plus or minus 20% of the frequency of the input frequency. It is understood that the frequencies selected are to provide the intended functionality and performance suitable for the given application.

Figure 27:
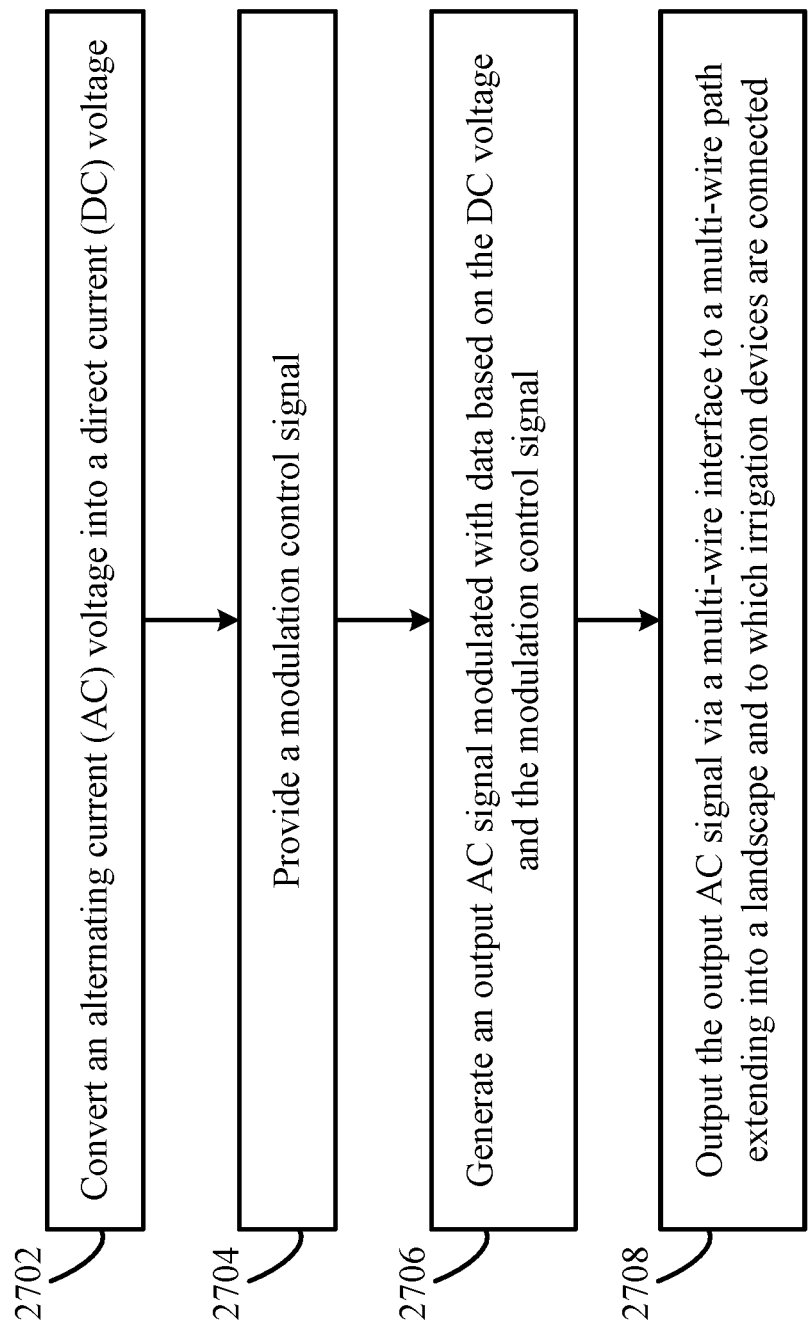
FIG. 27 is a flow diagram of an exemplary method of providing power and data to an irrigation device over a multi-wire path in accordance with some embodiments.

Referring next to FIG. 27, a flow diagram of an exemplary method 2700 of providing power and data to an irrigation device over a multi-wire path in accordance with some embodiments is shown. The method 2700 and/or one or more steps of the method 2700 may be implemented by any of the systems and encoders described herein, or by other systems and encoders. In some embodiments, the method 2700 includes converting, using an alternating current (AC) to direct current (DC) converter, an input AC signal into a DC voltage (Step 2702). In some embodiments, the method 2700 includes providing, by a control circuit, a modulation control signal to control generation of an output AC signal and modulation of data on the output AC signal, the data comprising commands in accordance with irrigation programming (Step 2704). In some embodiments, the method 2700 includes generating, by the AC signal generator, the output AC signal modulated with the data based on the DC voltage and the modulation control signal (Step 2706). And in some embodiments, the method 2700 includes outputting, via a multi-wire interface coupled to the AC signal generator, the output AC signal to a multi-wire path extending into a landscape and to which irrigation devices are connected (Step 2708).

Figure 28:
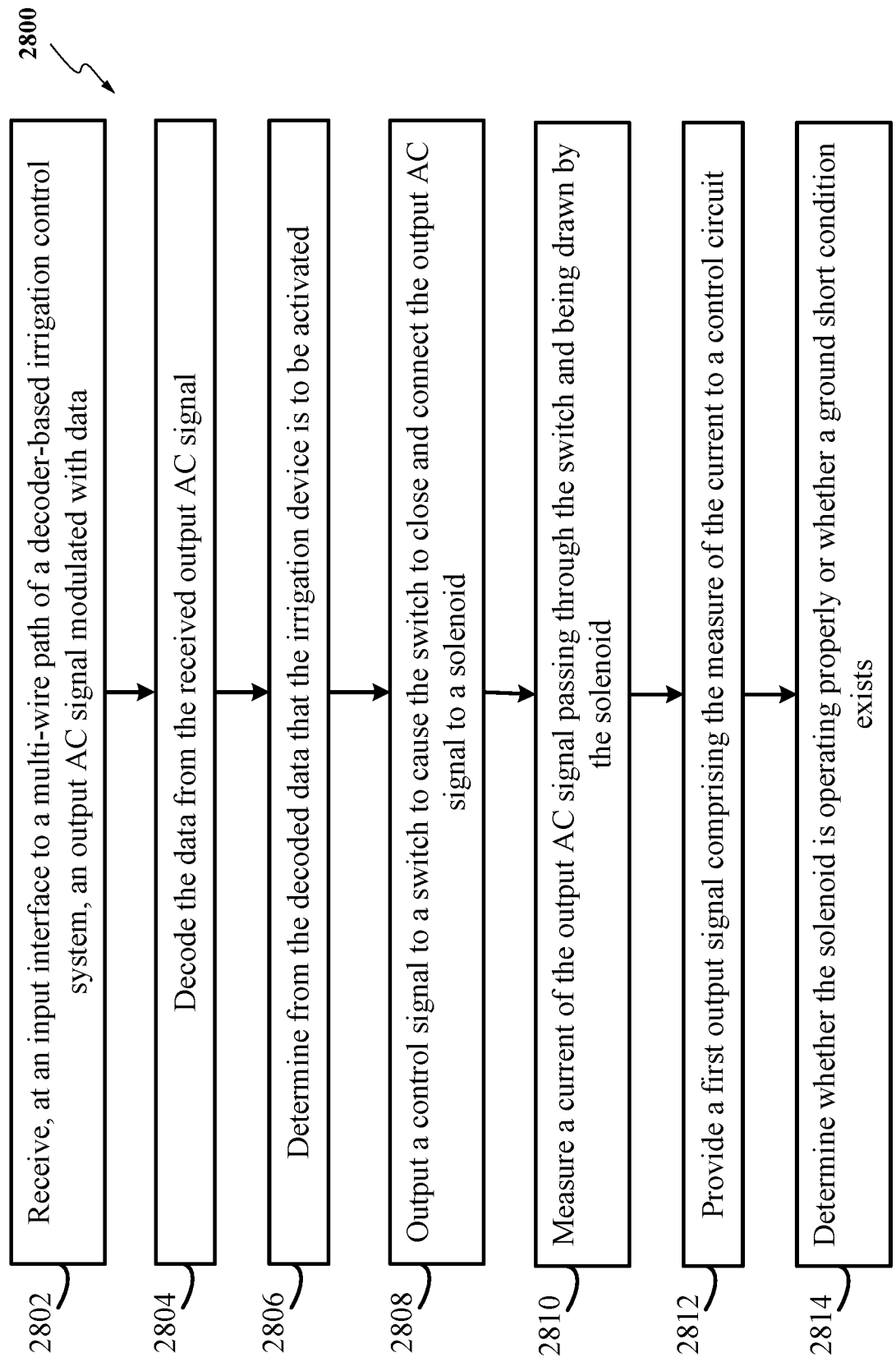
FIG. 28 is a flow diagram of an exemplary method of receiving power and data from an irrigation control unit over a multi-wire path.

Referring next to FIG. 28, a flow diagram of an exemplary method 2800 of receiving power and data at a decoder unit from an irrigation control unit over a multi-wire path in accordance with some embodiments is shown. The method 2800 and/or one or more steps of the method 2800 may be implemented by any of the systems and decoders described herein, or by other systems and decoders. In some embodiments, the method 2800 includes receiving, at an input interface of the decoder unit coupled to the multi-wire path of a decoder-based irrigation control system, an output AC signal modulated with data and having been transmitted by the irrigation control unit over the multi-wire path (Step 2802). In some embodiments, the method 2800 includes decoding, by a control circuit of a decoder circuit of the decoder unit, the data from the output AC signal (Step 2804). In some embodiments, the method 2800 includes determining, by the control circuit and from the decoded data, that an irrigation device is to be activated (Step 2806). In some embodiments, the method 2800 includes outputting, by the control circuit, a control signal to cause a switch to close and connect the output AC signal to a solenoid of the irrigation device (Step 2808). In some embodiments, the method 2800 includes measuring, by a current measure circuit coupled to the switch, a current of the output AC signal passing through the switch and being drawn by the solenoid (Step 2810). In some embodiments, the method 2800 includes providing, by the current measure circuit, a first output signal comprising the measure of the current to the control circuit (Step 2812). In some embodiments, the method 2800 includes determining, by the control circuit and based on the measure of the current, whether one of the solenoid is operating properly and whether a ground short condition exists (Step 2814).

Referring next to FIG. 29, a flow diagram of an exemplary method 2900 of receiving power and data at a decoder unit from an irrigation control unit over a multi-wire path in accordance with some embodiments is shown. The method 2900 and/or one or more steps of the method 2900 may be implemented by any of the systems and decoders described herein, or by other systems and decoders. In some embodiments, the method 2900 includes receiving, at an input interface of a decoder unit coupled to the multi-wire path of a decoder-based irrigation control system, an output AC signal modulated with data and having been transmitted by the irrigation control unit over the multi-wire path (Step 2902), In some embodiments, the output AC signal is modulated with the data through a selective modulation of a frequency of one or more cycles of the output AC signal to have a selectable one of a plurality of frequencies. In some embodiments, the method 2900 filtering, by a filter of a decoder circuit of the decoder unit coupled to the input interface, the output AC signal (Step 2904). In some embodiments, the filtering is optional. In some embodiments, the method 2900 includes limiting, by a clipper circuit of the decoder circuit, an amplitude of the filtered output AC signal (Step 2906). In some embodiments, the method 2900 includes receiving, at a control circuit of the decoder circuit, a filtered and clipped output AC signal from the clipper circuit (Step 2908). In some embodiments, the method 2900 includes detecting, by the control circuit, zero crossings and timing of the zero crossings of the filtered and clipped output AC signal (Step 2910). In some embodiments, the method 2900 includes determining, by the control circuit, a frequency of one or more cycles of the output AC signal based on the zero crossings and the timing of the zero crossings (Step 2912). In some embodiments, the method 2900 includes decoding, by the control circuit, the data modulated on the output AC signal based the frequency of multiple sets of the one or more cycles of the output AC signal (Step 2914). In some embodiments, the method 2900 includes determining, by the control circuit and from the decoded data, that an irrigation device is to be activated (Step 2916). In some embodiments, the method 2900 includes outputting, by the control circuit, a control signal to a switch to cause the switch to close and connect the output AC signal to a solenoid of an irrigation device (Step 2918).

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An encoder for an irrigation control unit that provides power and data to an irrigation device over a multi-wire path, the encoder comprising:
   an alternating current (AC) to direct current (DC) converter configured to convert an input AC signal into a DC voltage;
   an AC signal generator coupled to the AC to DC converter, the AC signal generator configured to generate an output AC signal modulated with data;
   a control circuit coupled to the AC signal generator and configured to:
      provide a modulation control signal to the AC signal generator to control generation and modulation of the output AC signal, the data modulated on the output AC signal comprising commands in accordance with irrigation programming; and
   a multi-wire interface coupled to the AC signal generator and configured to electrically couple to the multi-wire path extending into a landscape and to which irrigation devices are connected, wherein the output AC signal is modulated using frequency modulation, and wherein the output AC signal is modulated such that each cycle of the output AC signal representing data is selectively modulated at one of a first frequency and a second frequency,
   wherein the AC signal generator is configured to generate, using the modulation control signal, the output AC signal such that:
      during a first period, the output AC signal is modulated such that one or more cycles of the output AC signal are at one or more first frequencies to synchronize a start of a modulated data portion of the output AC signal;
      during a second period, the output AC signal is modulated such that the one or more cycles of the output AC signal are at one or more second frequencies to create the modulated data portion; and
      during a third period, the output AC signal is modulated such that the one or more cycles of the output AC signal are at the one or more first frequencies to synchronize an end of the modulated data portion of the output AC signal.

2. The encoder of claim 1, wherein the modulation control signal comprises a pulse width modulation signal.

3. The encoder of claim 2, further comprising a filter circuit coupled between the AC signal generator and the multi-wire interface.

4. The encoder of claim 1, wherein the AC signal generator comprises a Class-D amplifier.

5. The encoder of claim 1 wherein the output AC signal comprises a sine wave.

6. The encoder of claim 1, further comprising a current measure circuit configured to sense current drawn on the multi-wire path.

7. The encoder of claim 1, wherein the output AC signal is modulated such that a first digital bit is represented by the one or more cycles of the output AC signal modulated at the first frequency, and a second bit is represented by the one or more cycles of the output AC signal modulated at the second frequency.

8. The encoder of claim 1, wherein the output AC signal is modulated using Manchester encoding.

9. The encoder of claim 1, further comprising a first current measure circuit configured to provide a measure of a current of the output AC signal, wherein the control circuit is further configured to determine whether the irrigation devices are drawing power based on the measure of the current.

10. The encoder of claim 9, wherein the AC signal generator comprises an H-Bridge circuit, the first current measure circuit being disposed between the AC to DC converter and the H-Bridge circuit, and wherein the control circuit is further configured to detect ground faults in the H-Bridge circuit based on the measure of the current from the first current measure circuit.

11. The encoder of claim 9, wherein the AC signal generator comprises an H-Bridge circuit, the first current measure circuit being disposed at an output of the H-bridge circuit, and wherein the control circuit is further configured to determine a direction of a current flow over the multi-wire path based on the measure of the current.

12. The encoder of claim 9, wherein the AC signal generator comprises an H-Bridge circuit, the first current measure circuit being disposed between the H-Bridge circuit and a ground reference, and wherein proximity to the ground reference by the first current measure circuit enables the control circuit to more accurately determine the measure of the current based on the measure of the current from the first current measure circuit as compared to other determinations of the measure of the current when the first current measure circuit is not proximate to the ground reference.

13. The encoder of claim 12, further comprising a second current measure circuit disposed between the AC to DC converter and the H-Bridge circuit, wherein the control circuit is further configured to detect ground faults in the H-Bridge circuit based on based on the measure of the current from the second current measure circuit.

14. The encoder of claim 12, further comprising a second current measure circuit disposed between the H-Bridge circuit and the ground reference and parallel to the first current measure circuit, wherein the control circuit is further configured to determine a direction of a current flow over the multi-wire path based on the measure of current from the first current measure circuit and the second current measure circuit.

15. The encoder of claim 1, wherein, the AC signal generator is configured to generate, using the modulation control signal, the output AC signal such that the modulated data portion of the output AC signal comprises encoded data representing one or more of a first instruction to activate an irrigation device of the irrigation devices and a second instruction to deactivate the irrigation device.

16. The encoder of claim 1, wherein, the AC signal generator is configured to generate, using the modulation control signal, the output AC signal such that the modulated data portion of the output AC signal comprises encoded signaling at a frequency intended to produce a sound audible to a user to assist the user in locating an irrigation device of the irrigation devices in the landscape.

17. The encoder of claim 1, wherein the AC signal generator is configured to generate, using the modulation control signal, the output AC signal such that the modulated data portion of the output AC signal comprises encoded signaling by alternating groups of cycles of the output AC signal between two or more frequencies to produce a sound audible to a user to assist the user in locating an irrigation device of the irrigation devices in the landscape.

18. The encoder of claim 1, wherein, the AC signal generator is configured to generate, using the modulation control signal, the output AC signal such that during one or more periods within the modulated data portion of the output AC signal, the output AC signal is modulated such that the one or more cycles of the output AC signal are at the one or more first frequencies to separate data content of the modulated data portion.

* * * * *

UNITED STATES PATENT AND TRADEMARK OFFICE
CERTIFICATE OF CORRECTION

PATENT NO. : 11,357,181 B2
APPLICATION NO. : 17/175372
DATED : June 14, 2022
INVENTOR(S) : Harvey J. Nickerson et al.

It is certified that error appears in the above-identified patent and that said Letters Patent is hereby corrected as shown below:

In the Claims

Column 22, Line 36, Claim 13, delete "based on based on" and insert --based on--.

Signed and Sealed this
Twenty-seventh Day of September, 2022

*Katherine Kelly Vidal*

Katherine Kelly Vidal
*Director of the United States Patent and Trademark Office*